United States Patent [19]
Gavin et al.

[11] Patent Number: 5,615,382
[45] Date of Patent: Mar. 25, 1997

[54] DATA TRANSFER SYSTEM FOR BUFFERING AND SELECTIVELY MANIPULATING THE SIZE OF DATA BLOCKS BEING TRANSFERRED BETWEEN A PROCESSOR AND A SYSTEM BUS OF A COMPUTER SYSTEM

[75] Inventors: Vincent G. Gavin, Galway, Ireland; Michael J. Seaman, San Jose, Calif.; Neal A. Crook, Reading; Bipin Mistry, Edgware, both of United Kingdom

[73] Assignee: Digital Equipment Corporation, Maynard, Mass.

[21] Appl. No.: 468,486

[22] Filed: Jun. 6, 1995

Related U.S. Application Data

[63] Continuation of Ser. No. 819,468, Jan. 10, 1992, Pat. No. 5,471,632.
[51] Int. Cl.$^6$ .................................................... G06F 13/00
[52] U.S. Cl. ......................... 395/800; 395/853; 395/309; 395/250; 364/240; 364/239; 364/260; 364/DIG. 1
[58] Field of Search .................... 395/200, 825, 395/828, 872, 876, 800, 287, 306, 497.04, 200.13, 200.15, 250, 840, 841, 853, 881, 885, 309, 405; 370/85.1, 60, 92; 364/131–134

[56] References Cited

U.S. PATENT DOCUMENTS

| | | | |
|---|---|---|---|
| 3,979,719 | 9/1976 | Tooley et al. | 371/32 |
| 5,060,139 | 10/1991 | Theus | 395/303 |
| 5,255,375 | 10/1993 | Crook et al. | 395/285 |
| 5,471,632 | 11/1995 | Gavin et al. | 395/284 |
| 5,471,638 | 11/1995 | Keeley | 395/800 |
| 5,499,385 | 3/1996 | Farmwald et al. | 395/823 |

*Primary Examiner*—Alpesh M. Shah
*Attorney, Agent, or Firm*—Kenneth F. Kozik

[57] ABSTRACT

A data transfer device for coupling a processor to a system bus. The data transfer device includes data packers and unpackers for converting between data blocks of a first size and data blocks of a second size, e.g. between bytes or words and longwords. The data transfer device also includes an internal buffer memory system for storing the data being transferred. The processor and system bus are selectively coupled, each one at a time, via a direct data path, to the internal buffer memory system permitting both the processor and the system bus to independently read and write data, each at their normal data transfer rate.

12 Claims, 13 Drawing Sheets

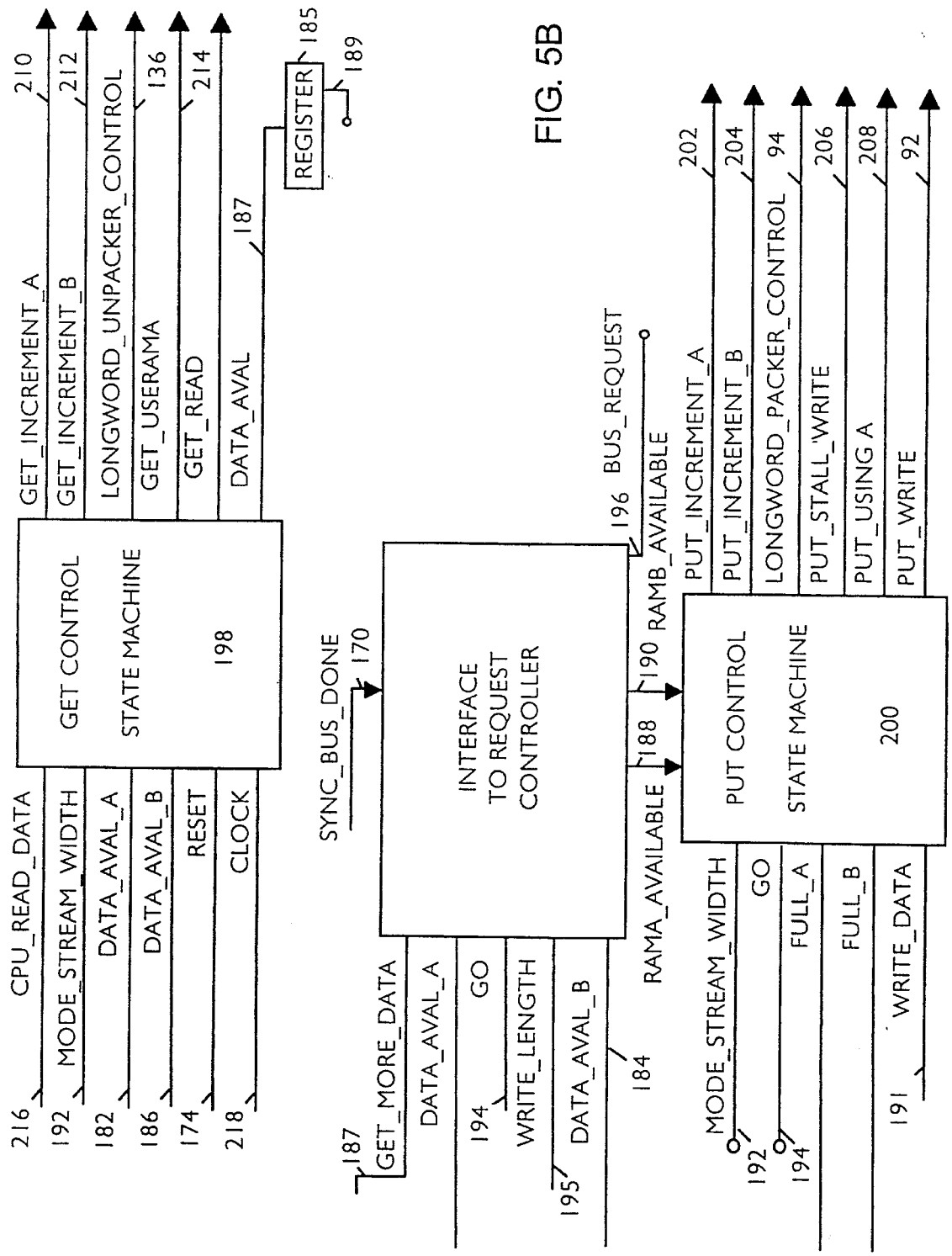

FIG. 6B

DATA TRANSFER SYSTEM FOR BUFFERING AND SELECTIVELY MANIPULATING THE SIZE OF DATA BLOCKS BEING TRANSFERRED BETWEEN A PROCESSOR AND A SYSTEM BUS OF A COMPUTER SYSTEM

This application is a continuation of application Ser. No. 07/819,468, filed on Jan. 10, 1992, now U.S. Pat. No. 5,471,632.

FIELD OF THE INVENTION

The present invention is directed to data transfers between a processor and a bus, and more particularly, to an apparatus that stores a bus address for use in a bus transaction and packs, unpacks and buffers data blocks for transfer between the processor and data lines of the bus during the bus transaction.

BACKGROUND OF THE INVENTION

Modern backplane bus based computer systems typically define an address space that encompasses all of the memory locations provided by all of the components coupled to the backplane bus. The components of the computer system can include a shared main memory. In this manner, each processor of the system can generate addresses for direct access to all of the memory locations available in the system. For example, the Futurebus backplane bus protocol provides for a 32 bit bus address.

However, each processor of the system may include a 64K byte RAM local memory wherein a 16 bit address is sufficient for access to the locations of the local memory. Moreover, each processor may also read and write data blocks to local memory in byte or word sized blocks and utilize 16 line data buses, whereas the bus operates with 32 bit or longword sized data block transfers. Thus, it is often necessary to provide a data transfer device between the processor and a bus interface to accommodate the generation of full bus addresses and to pack data blocks for transfer to the data lines of the bus and to unpack data blocks received from the bus for input to the processor.

In addition, a bus transaction to affect a data transfer over the bus requires an arbitration for the bus and transitions through bus phases pursuant to a protocol to properly transmit address information and data blocks over the bus. Typically, the bus arbitration and protocol functions are performed by the bus interface. However, a processor must ordinarily wait for data to be received from the bus or to transfer data onto the bus before continuing processor operations. Thus, the data transfer device should perform data buffering between the processor and bus to enable a processor to continue operating before a bus transaction is completed.

SUMMARY OF THE INVENTION

The present invention provides a new and improved data transfer device for coupling a processor to a bus. The processor is coupled to and can address multiple address and multiple data registers in the data transfer device to write address information and data for a bus transaction. The multiple address registers are used to generate a full bus address and the multiple data registers are coupled to a data packing circuit which package data blocks of a first size, as used in the processor, to a second size, consistent with the number of data lines on the bus. In a data transfer to the bus, as, e.g., when the processor must write data to another component coupled to the bus, the data transfer device address registers receive and store a bus address from the processor for use in a bus transaction once a bus request is made and the bus interface coupled to the processor wins the bus arbitration. The data packing circuit transfers data from the data registers, as data are received from the processor, and packs the data into blocks of the second size. The packed data are then stored in a local memory, such as, e.g., a RAM, again for use in the bus transaction. The processor can continue its operation as soon as the bus address is stored in the address registers of the data transfer device and all of the data to be transferred over the bus have been transferred to the data registers.

In a data transfer from the bus to the processor, as, e.g., when the processor must read data from another component coupled to the bus, the processor writes a starting read address into the address registers and the amount of data to be read into a length register provided in the data transfer device. The writing of a value into the length register is used by the data transfer device as a signal to initiate a bus transaction. Upon an arbitration win for the bus, read data are transferred over the bus, starting from the starting address and continuing until the amount of data indicated in the length register is transferred over the bus.

The read data transferred over the bus to the data transfer device is stored in the RAM. The data output of the RAM is coupled to a data unpacker to unpack the data blocks received from the bus from the second size, consistent with the number of data lines on the bus, to the first size, as required by the data lines available within the processor. A status register is readable by the processor and stores information indicating whether read data are in the RAM of the data transfer device and information regarding the type of transaction in progress.

In this manner, the processor can use the data transfer device to pre-fetch data required by the processor. Once the processor writes a length into the length register, it can perform other processing functions until the data are stored in the RAM and are ready for unpacking, as indicated in the status register. When the processor ascertains that the read data are stored in the RAM, via the status register, it reads the data register. The data transfer device is responsive to the read request from the processor to read the RAM, unpack the data and direct the unpacked data to the processor.

Thus, the data transfer device according to the present invention provides efficient data transfer services for a processor in a manner that reduces cycle time required for the processor to wait for completion of bus transactions. The read mode of the data transfer device permits pre-fetching of data so that the processor can be programmed to perform processing functions during the completion of a read transaction over the bus. In addition, the processor need only write address information and data to appropriate registers of the data transfer device with all bus transaction responsibility being off loaded to the data transfer device and the bus interface. The RAM provided in the data transfer device can be sized for efficient buffering of data commensurate with data size transfers permitted by the protocol implemented on the bus.

In one embodiment of the data transfer device, two RAMs are provided so that parallel operations can be supported by the data transfer device. For example, the processor can receive data from one of the RAMs via the data unpacker while the other RAM is being written with data from the data lines of the bus. Similarly, data in one of the RAMs can be transferred to the data lines of the bus while the processor is writing data to the data register for packing and writing to the other RAM.

The data register arrangement provides a queued entry point for data to be transferred to the bus. The processor addresses the data register and the data transfer device completes the packing of the data and writing to the RAM at internally generated addresses. To that end, counter circuiting is provided in the data transfer device to automatically generate and increment RAM addresses for efficient storage of data in the RAM. The queued entry arrangement simplifies software requirements for the processor since the processor only sees a limited register address space and need not generate addresses for the RAM.

Moreover, multiple, parallel data transfer devices can be arranged between the processor and the bus interface. In this manner, the processor can initiate multiple, parallel bus read and write transactions so that bus data transfers can be pipelined to increase bus transfer efficiency.

In addition to supporting multiple, parallel data transfers, the apparatus of the present invention provides direct data paths from both the CPU and the bus to the RAM buffers. This permits both the CPU and the bus to read and write address and data information at their own speed. Control signals from the CPU and the bus provide a direct means of control during a read or write operation with the RAM of the data transfer device further enhancing the present inventions ability to handle transactions at either the bus's or CPU's normal operating speed without a reduction in data transfer rates.

BRIEF DESCRIPTION OF THE DRAWINGS

FIG. 6b is a schematic representation of the overlapping bit scheme implemented in the address register arrangement of FIG. 6a.

DETAILED DESCRIPTION

Figure 1:
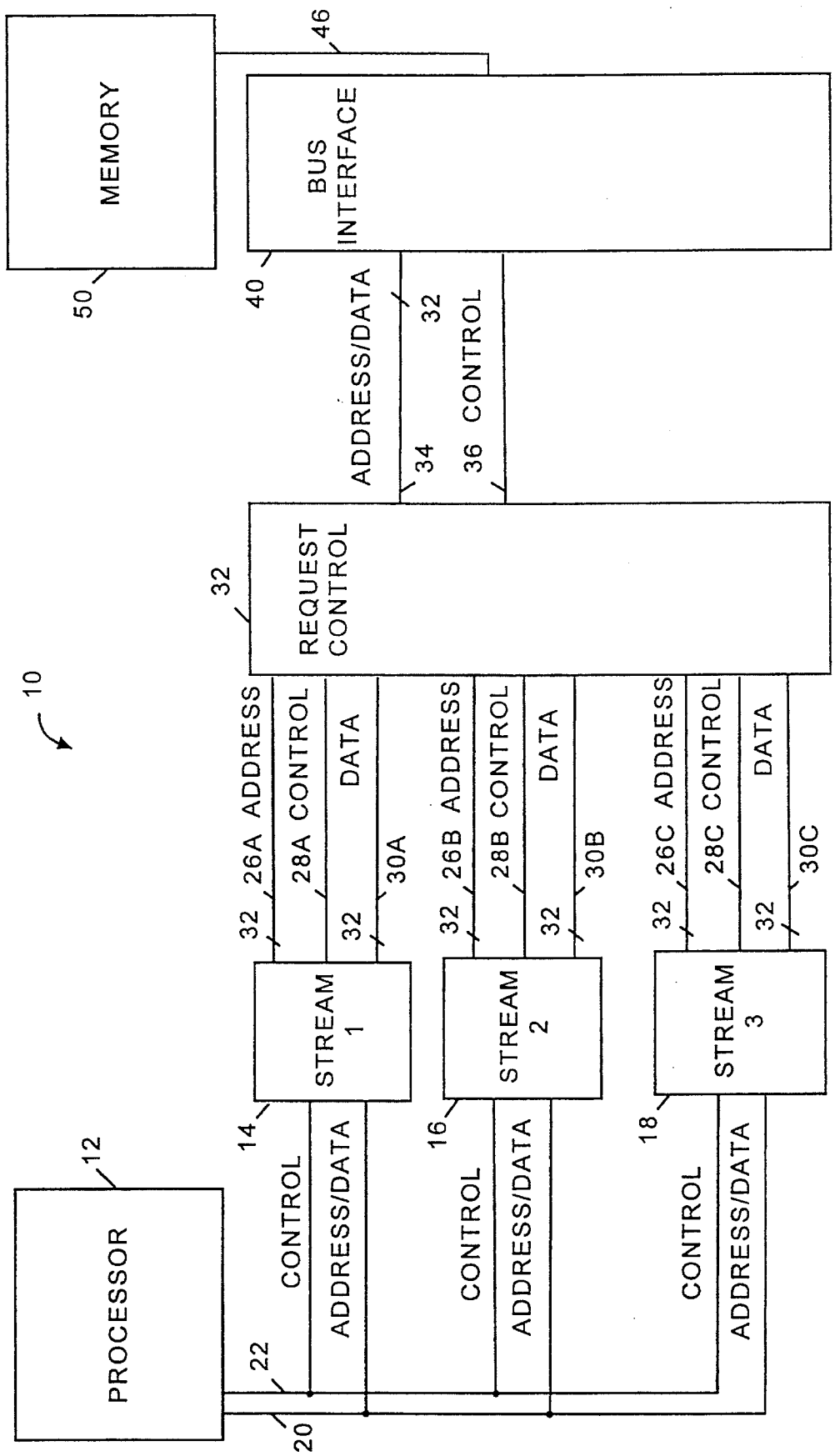
FIG. 1 is a block diagram of a computer system wherein a processor is coupled to a bus in accordance with an exemplary embodiment of the present invention.

Referring now to the drawings and initially to FIG. 1, there is illustrated a computer system generally indicated by the reference numeral 10. The computer system 10 comprises a processor (CPU) 12 which is coupled to three stream controllers 14, 16, 18 by a sixteen bit address/data bus 20, and a control bus 22. The stream controllers 14, 16 and 18 may each comprise, e.g. a block of RAM memory for buffering address and data information and a mechanism for converting between the sixteen bit CPU signals and thirty-two bit bus signals.

Each one of the stream controllers 14, 16, and 18 is coupled to a bus request controller 32 by a 32 bit address bus 26A, 26B, or 26C, a control bus 28A, 28B or 28C and a 32 bit data bus 30A, 30B or 30C. The stream controllers 14, 16, 18 convert between the sixteen bit signals which are used for transmitting data and address information to and from the CPU 12, and the thirty-two bit data and address information which is sent to and received from the bus request controller 32.

The bus request controller 32 is in turn coupled to a bus interface 40 by a thirty-two bit address/data bus 34 and a control bus 36. The bus interface 40 is coupled to a system bus 46 which comprises e.g. thirty-two address/data lines and several control lines. The system bus 46 is in turn coupled to a block of memory 50 which the CPU 12 can access to store or retrieve data.

The CPU 12 can make either a "put" or "get" request to the bus request controller 32 via any one of the stream controllers 14, 16, or 18. A put request indicates that the CPU 12 has data which it wants to store in the memory 50, while a get request indicates that the CPU 12 wants to retrieve data from the memory 50.

When asserting a get request, the CPU 12 outputs a CPU_DATA_IN signal which contains the starting address in memory 50 where the first byte of data to be read is located and information on the number of longwords the CPU 12 wants to read.

When a put request is asserted, as opposed to a get request, the CPU 12 will provide the starting address in memory where the data are to be stored, and the data to be stored in a series of cycles. The stream controller 14, 16, or 18, passes the starting address in memory where the data are to be stored to the bus 46. The bus protocol is then responsible for updating the address for each sequential longword stored in memory. The bus protocol increments the starting address supplied from the CPU 12 to generate each subsequent address for each sequential longword.

The bus request controller 32 processes bus requests which are generated by the stream controllers 14, 16, 18 and proceeds to obtain access to the bus 46 via the bus interface 40 so that the respective stream controller 14, 16, 18 can carry out the requested data transfer for the CPU 12.

By having multiple stream controllers as opposed to a single stream controller 14, 16, or 18, it is possible for the CPU 12 to make multiple put or get requests with each request being handled by a different stream controller 14, 16 or 18. In this manner, several CPU requests may be made without requiring the CPU 12 to wait until the previous request has been serviced. Each stream controller 14, 16, or 18 can pack and store the data from the CPU 12 to be written to memory 50 during a put request until the bus 46 is available. This leaves the CPU 12 free to process other tasks without having to wait for access to the system bus 46.

In a similar manner, when a get request is asserted by the CPU 12, the CPU 12 need only pass the stream controller 14, 16, or 18 the starting address in the memory 50 and the length of the data to be retrieved. The CPU 12 is then free to return to other tasks. The stream controller 14, 16, or 18 can then assert a bus request, pre-fetch the data from memory and store it in one of the stream's buffers until the CPU 12 is ready to receive the data that was requested. When the stream controller 14, 16, or 18 has retrieved, i.e. prefetched the requested data, a DATA__AVAL bit is set by a get control state machine 198 in a status register 185 (see FIG. 5) which can be checked by the CPU 12 to determine if the stream controller 14, 16, or 18 has retrieved the requested data. The status register 185 is coupled by a line 187 to the get control state machine 198 and to control input terminals of the stream controller 14, 16, or 18 by a bus 189. If the DATA__AVAL bit is set in the status register 185, it indicates that the CPU 12 can read the data from the stream controller 14, 16, or 18 when it is no longer occupied with other tasks.

While only one stream controller 14, 16 or 18 may gain access to the bus at any given time, having multiple stream controllers has the advantage of creating a queue of put and get requests which are ready to be serviced whenever the bus 46 becomes available to complete the requested task.

Figure 2:
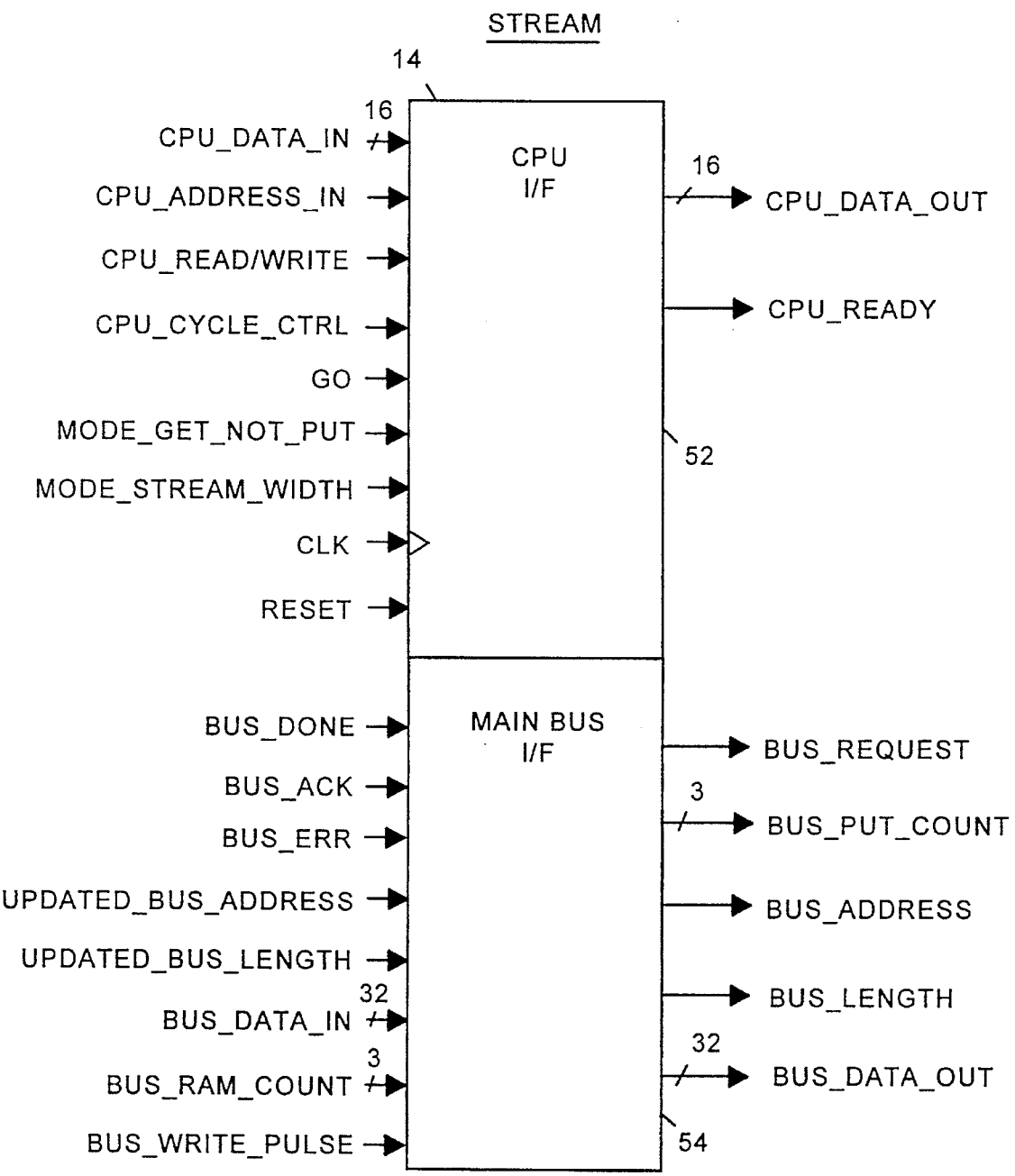
FIG. 2 is a block diagram which illustrates one of the stream controllers of FIG. 1 with its corresponding input and output signals according to the present invention.

FIG. 2 illustrates one of the stream controllers, e.g. 14, of FIG. 1 with its corresponding input and output signals. The stream controller 14 receives and outputs data to both the CPU 12 and the bus request controller 32. A CPU interface portion 52 of the stream controller 14 of FIG. 2, receives and sends signals to the CPU 12 while a main bus interface 54 of the stream controller 14 receives and sends signals to the bus request controller 32.

The sixteen bit address/data bus 20 serves as a path by which the CPU 12 and the stream controllers 14, 16, 18 exchange address, data length and data information. The address/data bus 20 supplies the corresponding input terminals of the CPU interface 52 with the input signals CPU__DATA__IN and CPU__ADDRESS__IN which are output by the CPU 12. The CPU interface 52 in turn, supplies the CPU 12 with the signal CPU__DATA__OUT via the data/address bus 20.

The control signals output by the CPU 12 are supplied to the CPU interface 52 by the control line 22. The CPU 12 supplies the control signals CPU__READ/WRITE, CPU__CYCLE__CTRL, GO, MODE__GET__NOT__PUT, MODE__STREAM__WIDTH, CLOCK, and RESET to the corresponding input terminals of the CPU interface 52. The input signals GO, MODE__GET__NOT__PUT and MODE__STREAM__WIDTH are stored in the status register 185 (see FIG. 5) which is supplied with the signals from the CPU 12 by the bus 189. The status register 185 stores and holds the signals MODE__GET__NOT__PUT and MODE__STREAM__WIDTH while the GO signal which is also stored in the status register 185 is cleared after 1 cycle so that it doesn't remain asserted.

When a go or put transaction is in progress as indicated by the bits set in the status register 185, the direction of the stream's data paths are set until the requested transaction is completed. Accordingly, it is possible during a get transaction for the CPU 12 to read from the RAM 98 or 100 while data from the bus 46 is simultaneously being written from the bus 46 to the other RAM 98 or 100. However, it would not be possible for the CPU 12 to read from the RAM 98 or 100 while data was being placed on the bus 46.

In the same manner, it is possible during a put request, for the CPU 12 to write data to one of the RAMs 98 or 100 and for data to be placed on the bus 46 from the other RAM 98 or 100, simultaneously.

The control signal CPU__READY is output by the stream controller's CPU interface 52 which is coupled to the CPU 12 by the control bus 20 and serves as an input signal to the CPU 12. The CPU__READY signal indicates that a transaction has been completed as far as communication between the CPU 12 and the stream controller 14 are concerned. Accordingly, the CPU__READY signal is asserted when the stream controller 14, has received the data from the CPU 12 during a put request or the stream controller 14 has supplied the data requested by the CPU 12 to the CPU__DATA__OUT bus 138 during a get request.

The stream controllers' main bus interface 54 sends and receives address, control, and data signals to and from the bus request controller 32 by means of the respective address bus 26A, 26B or 26C, control bus 28A, 28B, or 28C and data bus 30A, 30B, or 30C.

The bus request controller's control output signals, BUS__DONE, BUS__ACK, BUS__ERROR, UPDATED__BUS__LENGTH, BUS__RAM__COUNT, and BUS__WRITE__PULSE are supplied to the corresponding input terminals of the stream controller's main bus interface 34 by the control bus 28A, 28B, or 28C.

The address signal UPDATED__BUS__ADDRESS is supplied from the bus controller 32 to the input of the stream controller's main bus interface 54 by the respective address bus 26A, 26B, or 26C. The control data bus 30A, 30B or 30C supplies the stream controller's main bus interface 54 with the data signal BUS__DATA__IN which is output by the bus controller 32.

The stream controller's main bus interface 54 outputs the control signals BUS__REQUEST, BUS__PUT__COUNT and BUS__LENGTH which are supplied by the control data bus 30A, 30B or 30C to the input of the bus request controller 32. The main bus interface 54 also outputs the address signal BUS__ADDRESS which is supplied to an input of the bus request controller 32 by the address bus 26A, 26B or 26C. The BUS__DATA__OUT signal output by the stream controller's main bus interface 54 is supplied to an input of the bus request controller 32 by the data bus 30A, 30B, or 30C.

Figure 3:
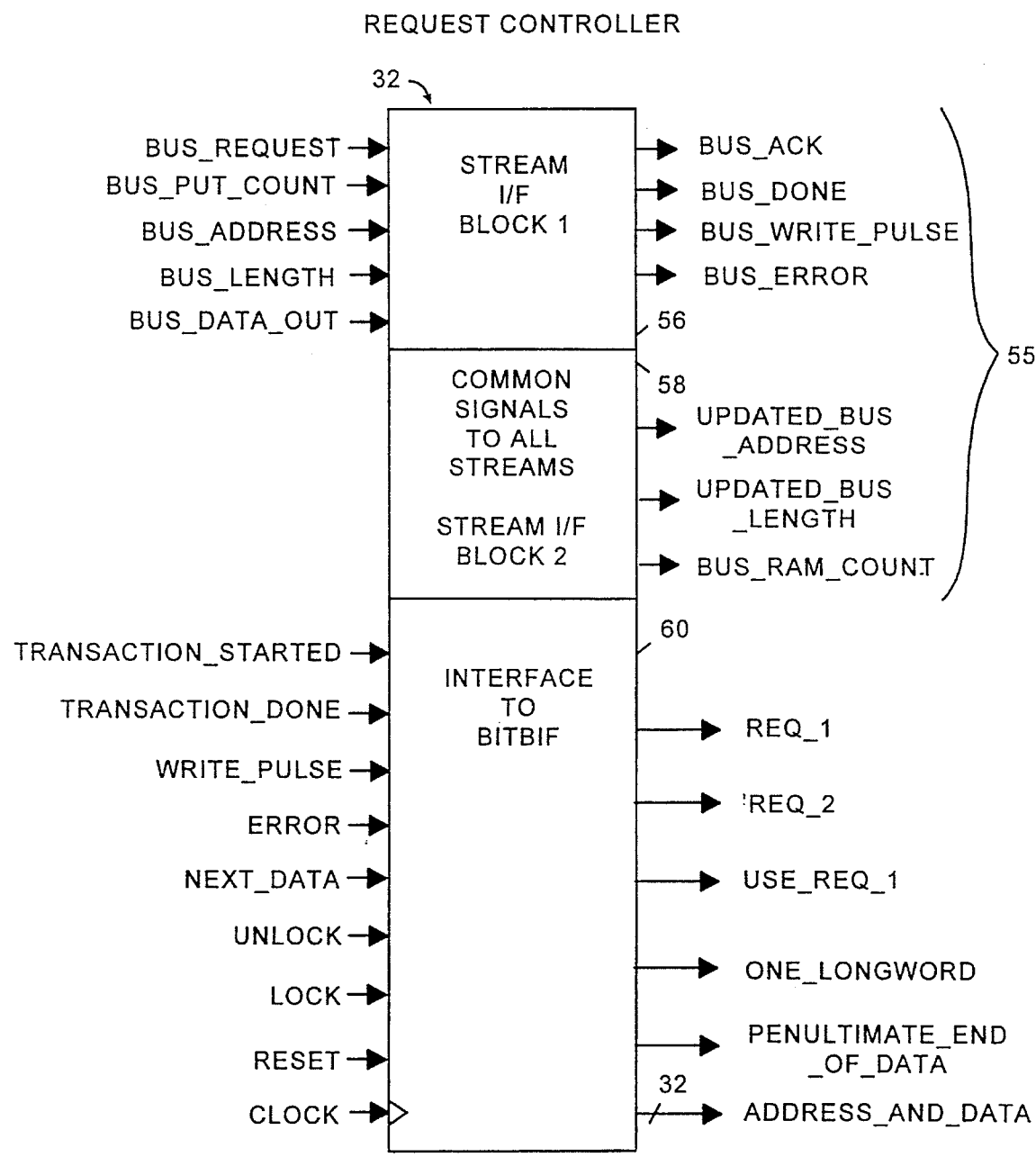
FIG. 3 is a block diagram which illustrates the request controller of FIG. 1, according to the present invention, with its corresponding input and output signals.

Referring now to FIG. 3, there is illustrated a block diagram representing the bus request controller 32 with its corresponding input and output signals. The bus request controller 32 prioritises requests from all streams 14, 16, 18, interfaces to the bus interface 40 and selects address and length values which are used by the streams during each bus transaction.

The input and output signals to and from the bus request controller 32 may be divided into three groups represented by three blocks. A first block 56 represents the input and output terminals of the request controller's stream interface 55 and the corresponding input and output signals of the bus request controller 32 which are associated with a particular stream controller 14, 16, or 18.

A second block 58 represents the output terminals of another portion of the bus request controller's stream interface 55. The block 58 represents signals output by the bus request controller 32 which are common to all of the stream controllers 14, 16, 18.

The third block of the bus request controller 32, represents the bus request controller's interface 60 to the system bus interface 40.

The bus request controller 32 has the output signals from the stream controllers's bus interface 54 supplied as input signals as described above. Accordingly, the first block 56 receives as input signals the stream controller's output signals BUS_REQUEST, BUS_PUT_COUNT, BUS_ADDRESS, BUS_LENGTH and BUS_DATA_OUT as input signals which are supplied to the bus controller's stream interface 55.

The stream 14, 16, or 18 asserts a BUS_REQUEST when it needs the system bus 46 to service a put or get request asserted by the CPU 12. The BUS_PUT_COUNT indicates to the bus request controller 32 the number of longwords the stream 14, 16, or 18 has to write to the memory 50 in order to service the put request. The signal BUS_ADDRESS is used to indicate the starting address in the memory 50 where the bus 46 is either to retrieve data from or write the data to depending on whether a get or put request have been asserted, respectively. The BUS_LENGTH signal is used to indicate the number of longwords that should be retrieved in response to a particular get request while the BUS_DATA_OUT signal from the stream controller 14, 16, or 18 is the data which is to be written to the memory 50 during the sequence that comprises servicing of the given put request.

The bus request controller 32 outputs a set of control signals BUS_ACK, BUS_DONE, BUS_WRITE_PULSE and BUS_ERROR to each of the individual stream controllers 14, 16 and 18. The control signals are supplied to the respective stream controllers 14, 16, 18 by the respective control buses 28A, 28B, 28C.

The BUS_ACK signal is output in response to a BUS_REQUEST input signal. The BUS_ACK signal is sent to a requesting stream controller 14, 16 or 18, by the bus request controller 32 to acknowledge the bus request and to indicate to the particular stream controller 14, 16 or 18 that a bus transaction has started. When the stream controller 14, 16, or 18 receives the BUS_ACK signal, it causes the stream controller to deassert the BUS_REQUEST signal.

The BUS_DONE signal is sent to the stream controllers to indicate that the bus transaction has been completed. The BUS_WRITE_PULSE is output to the stream controller 14, 16 or 18 to indicate that data are stable on the bus and ready to be written from the bus 46 to one of the stream buffers RAMA 98 or RAMB 100 (see FIG. 4) in response to a get request by the CPU 12. The signal BUS_ERROR is output to the stream controller 14, 16, or 18 whenever a bus transaction was unsuccessful.

The second block of signals 58 output by the request controller's stream interface 55, represent signals which are common to all of the stream controllers 14, 16, 18. The bus request controller 32 outputs the common signals UPDATED_BUS_LENGTH and BUS_RAM_COUNT which are supplied to all the stream controllers via the control busses 28A, 28B, 28C. The common signal UPDATED_BUS_ADDRESS is output by the bus request controller 32 and is supplied to the stream controllers 14, 16, 18 by the address busses 26A, 26B, 26C.

The signal UPDATED_BUS_LENGTH is generated by the request control 32 during a get operation to update the number of longwords that must still be fetched from main memory 50 after completion of a current bus transaction. This value is supplied to the stream controller 14 to update the BUS_LENGTH value.

The BUS_RAM_COUNT signal is generated by the bus request controller 32 and is used as the RAM address during a put or get request whenever data are being written to the stream controller 14 from the bus 46 or read from the given RAM of the stream controller 14 and placed on the bus 46. Accordingly, the BUS_RAM_COUNT signal indicates the number of longwords written to the stream controller 14 from the bus 46 or read from the given RAM of the stream controller 14 and placed on the bus 46.

The UPDATED_BUS_ADDRESS signal is also generated by the bus request controller 32 to provide a subsequent address after the address provided by the CPU 12. These addresses are for accessing subsequent longwords after the longword accessed by the starting address provided by the CPU 12. The UPDATED_BUS_ADDRESS signal is used by the stream controller 14 during a put request which requires more than a single bus transaction to complete. While the CPU 12 supplies the initial starting address in memory where data are to be stored, the bus protocol generates subsequent addresses by incrementing the starting address. When a put request requires more than a single bus transaction to complete, the bus request controller 32 supplies the stream 14 with the signal UPDATED_BUS_ADDRESS which is used as the starting address for the subsequent write to memory as part of the same put request.

Since all bus data and bus addresses are passed through the bus request controller 32, as illustrated in FIG. 3, this component is able to monitor bus activity and thereby generate the UPDATED_BUS_LENGTH, UPDATED_RAM_COUNT and UPDATED_BUS_ADDRESS signals.

The third block of the bus request controller 32 represents the request controller's interface 60 to the system bus interface 40. The bus controller 32 receives the control signals TRANSACTION_STARTED, TRANSACTION_DONE, ERROR, WRITE_PULSE, NEXT_DATA, UNLOCK, LOCK, RESET and CLOCK from the system bus interface 40 via the control bus 36.

The signal TRANSACTION_STARTED is asserted by the bus interface 40, upon obtaining access to the bus 46, and indicates to the bus request controller 32 that it can proceed to service the bus request asserted by the stream controller 14, 16, or 18.

The signal TRANSACTION_DONE is used to indicate to the bus request controller 32 that the bus transaction has been completed and is used by the bus request controller 32 in determining when to assert the BUS_DONE signal. The assertion of the BUS_DONE signal causes the stream controller 14, 16, or 18 to load the updated bus address and length values provided by the signals UPDATED_BUS_ADDRESS and UPDATED_BUS_LENGTH output by the bus request controller 32.

When a bus transaction is unsuccessful, the assertion of the TRANSACTION_DONE signal will be accompanied by the assertion of an ERROR or LOCK signal from the bus interface 40. The bus request controller will proceed to assert the output signal BUS_ERROR indicating to the streams that the bus transaction was unsuccessful.

Upon receiving an asserted ERROR or LOCK signal, in response to a bus transaction error, the bus request controller 32 locks all streams until the signal UNLOCK is received. The signal UNLOCK is generated by the CPU 12 and is supplied to a register in the bus interface 40. In turn, the bus interface 40, under the control of the CPU 12, supplies the signal unlock to the stream controllers 14, 16, 18.

The bus controller's interface 60 to the system bus interface 40, outputs the control signals REQ_1, REQ_2, USE_REQ_1, ONE_LONGWORD, and PENULTIMATE_END_OF_DATA which are supplied to the system bus interface by the control bus 36. The control signals REQ_1, REQ_2 and USE_REQ_1 are used to implement request pipelining when there are multiple stream controllers 14, 16, 18 and thus multiple requests from the CPU available for servicing at any given time.

The signals ONE_LONGWORD and PENULTIMATE_END_OF_DATA are asserted by the bus request controller 32 to indicate to the bus interface 40 when there is only one longword remaining to be transferred to and from the bus 46.

The address and data signals output by the bus request controller's interface 60 to the system bus interface 40 are in the form of ADDRESS_AND_DATA signals which are passed to the bus interface 40 over a number of clock cycles. The ADDRESS_AND_DATA signals are supplied to the system bus interface 40 by the address/data bus 34 which is coupled to both the request controller 32 and the bus interface 40.

Figure 4A:
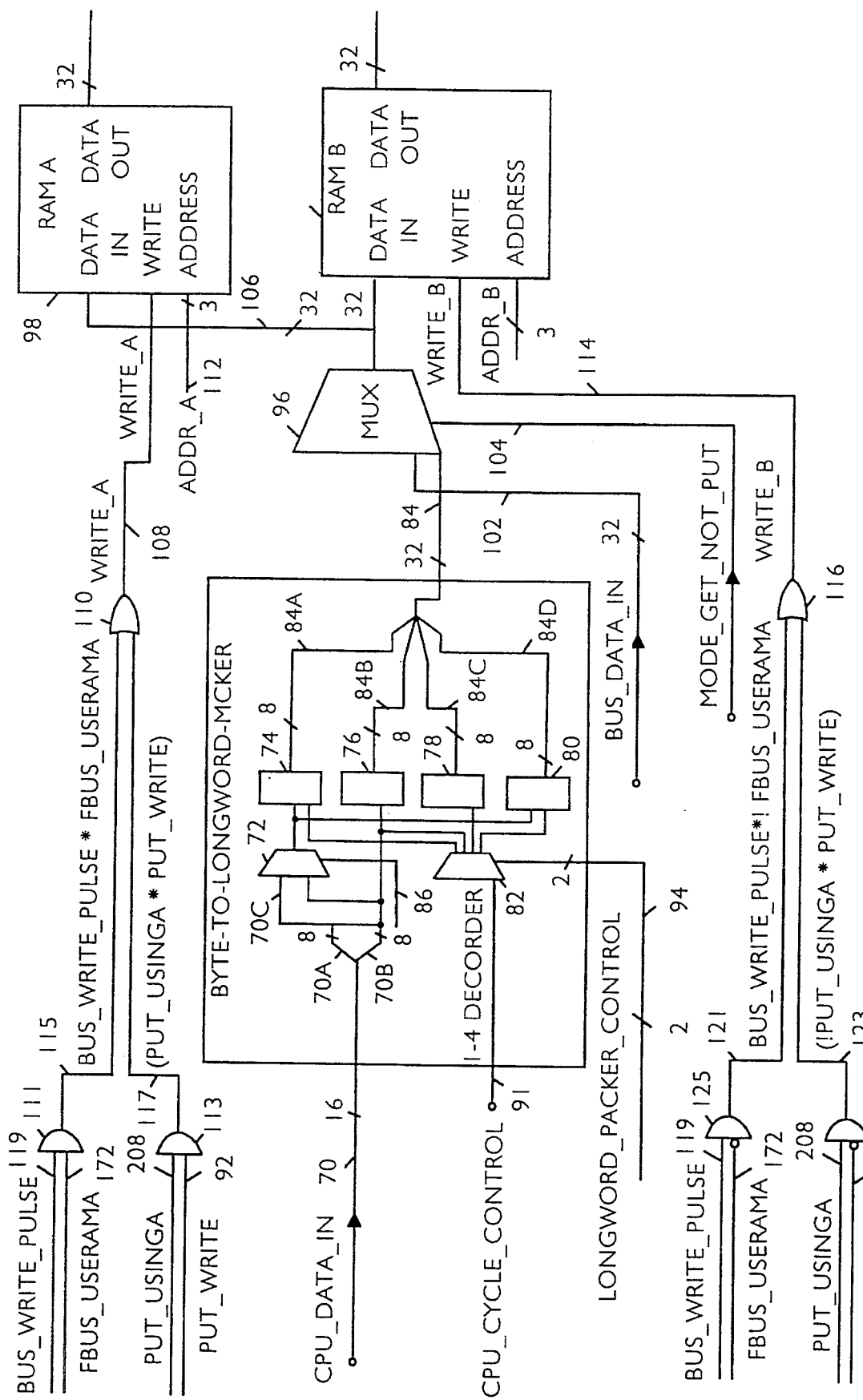
FIG. 4, which comprises the combination of FIGS. 4A and 4B, illustrates a more detailed schematic block diagram of the data packing and memory units of the stream controller of FIG. 2 according to the present invention.
Figure 4B:
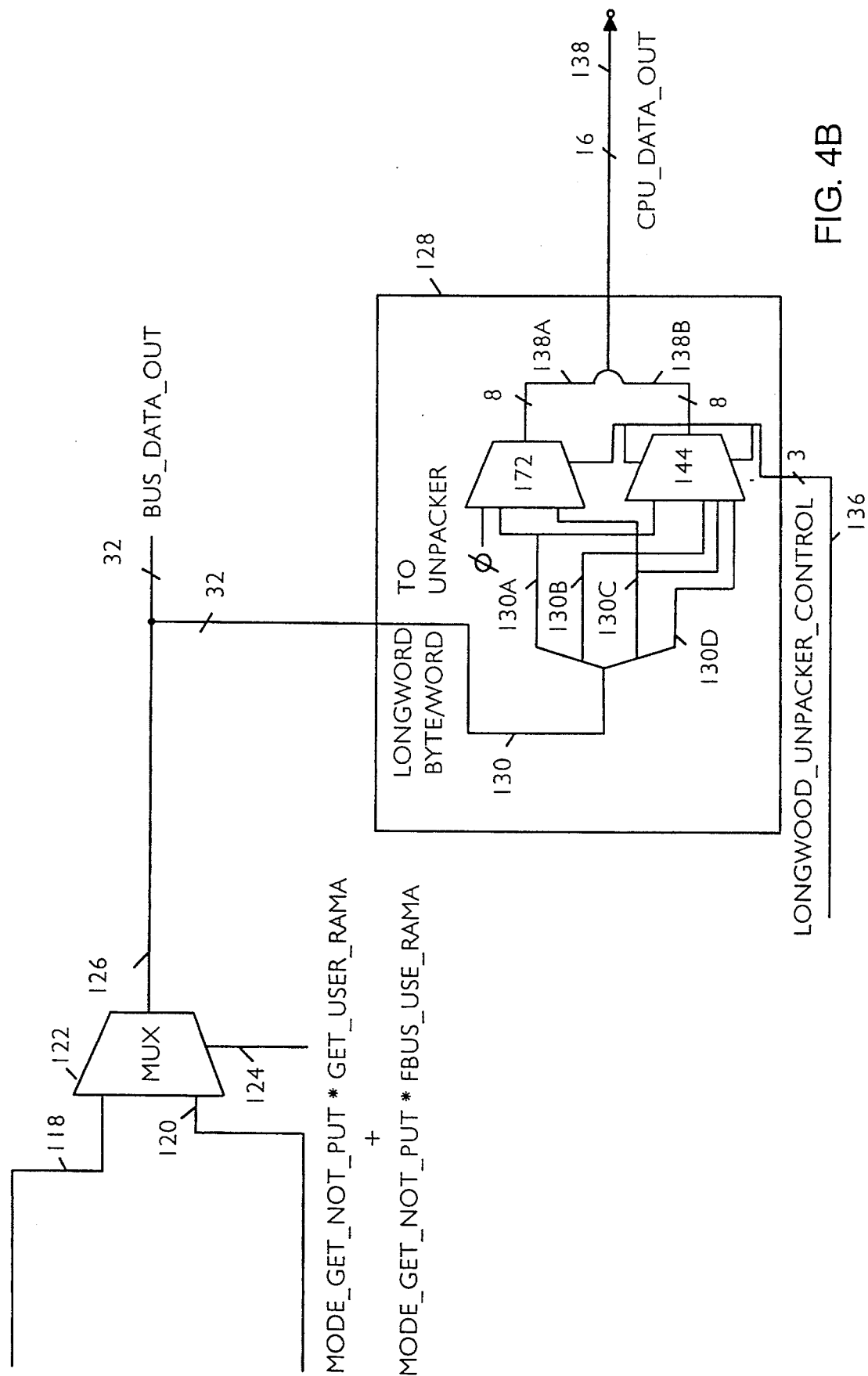

Referring now to FIG. 4, there is illustrated a more detailed schematic block diagram of the stream controller's internal memory and mechanism for converting between the sixteen bit data signals used by the CPU 12 and the thirty-two bit data signals used by the system bus 40 and the bus controller 32.

The 16 bit input signal CPU_DATA_IN is supplied from the CPU 12 to a 16 bit data input bus 70, of the stream controller 14, by the address/data bus 20. The data input bus 70, which splits into two 8 bit busses 70A and 70B, supplies the signal CPU_DATA_IN to a byte/word to longword packer 71.

The bus 70A is coupled to the first input of a MUX 72. The bus 70B is coupled to the second input of the MUX 72 and to an input of each of a register 76 and a register 80 which are the second and fourth registers respectively, in a series of four registers 74, 76, 78, 80. In this manner, the bus 70A supplies the highest byte of the CPU_DATA_IN signal to the first input of the MUX 72. The bus 70B supplies the lower byte of the CPU_DATA_IN signal to the second input of the MUX 72, the second register 76, and the fourth register 80. The output of the MUX 72 is coupled to the input of the first register 74 and the third register 78. A control select line 86 of the MUX 72, is supplied with the control signal MODE_STREAM_WIDTH from the CPU 12, by the control bus 22.

The signal MODE_STREAM_WIDTH is used to indicate whether the signal from the CPU is a byte or a word of data. If the CPU_DATA_IN signal contains only a byte of data, the signal MODE_STREAM_WIDTH will not be asserted. This indicates that the upper byte of the CPU_DATA_IN signal was packed with zeros by the CPU 12 and should be discarded. Accordingly, the MUX 72 selects the bus 70B, which contains the lower byte of the CPU_DATA_IN signal, as the source of its output signal. In this manner, when only a byte of data are supplied by the signal CPU_DATA_IN, the signal MODE_STREAM_WIDTH will be low causing the lower byte of the CPU_DATA_IN signal to be supplied for several CPU cycles sequentially to all four of the registers 74, 76, 78, 80 via the MUX output to the registers 74, 78 or directly to the registers 76, 80 in a series of cycles over the bus 70B.

However, when the signal MODE_STREAM_WIDTH is asserted, it indicates that the CPU_DATA_IN signal from the CPU 12 contains a full word of data. Accordingly, the MUX 72 selects the bus 70A which contains the upper byte of the CPU_DATA_IN signal as the source of its output signal which is latched into the register 78. During the same cycle, the lower byte of the CPU_DATA_IN signal is latched into register 80. The upper and lower bytes of the CPU_DATA_IN signal will be latched into the registers 74, 76 respectively, during the next cycle forming a full longword which is output to the MUX 96.

The outputs of each one of the 8 bit registers 74, 76, 78, 80 are coupled by 8 bit portions 84A, 84B, 84C, 84D of the 32 bit bus 84 to the input of a MUX 96. Thus, the fourth register 80 supplies the lowest byte of the longword output by the packer 71. The third register 78 provides the second highest byte in the longword while the second and first registers 76, 74 respectively, provide the third and fourth bytes of the longword output by the byte/word to longword packer 71.

A decoder 82 generates the CLOCK signal inputs to the four registers 74, 76, 78, 80. The decoder 82 has its input coupled to a line 91 which supplies the signal CPU_CYCLE_CONTROL output by the CPU 12. A LONGWORD_PACKER_CONTROL signal is supplied to the decoder's select output control input by a bus 94. While the CPU_CYCLE_CONTROL signal is supplied by the CPU 12, the LONGWORD_PACKER_CONTROL signal is generated within the stream controller 14 by a 'put' control state machine 200 (see FIG. 5), as will be explained below.

The decoder 82 has four outputs with one of the outputs being coupled by a line 84, 86, 88, or 90 to a respective clock input on each of the corresponding first through fourth registers 74, 76, 78, 80. The decoder 82 controls which register will store the data contained in the CPU_DATA_IN signal by enabling the registers at the appropriate time, one per cycle of data on the bus 70B as indicated by the LONGWORD_PACKER_CONTROL signal which selects the line 84, 86, 88 or 90 to receive the CPU_CYCLE_CONTROL signal as an output.

The CPU_CYCLE_CONTROL signal serves as an enable signal to the register receiving the signal. In this manner, the decoder 82 is used to pack the information from the CPU 12 into the four 8 bit registers 74, 76, 78, 80 to create a longword which can be sent to the system bus 46. This avoids the problem of wasted bus bandwidth which would result if bytes or words, packed with zeros to form longwords were placed directly on the 32 bit bus 46.

The longword output by the packer 71 is supplied as a first input to the MUX 96 by the bus 84 which couples the output of the packer 71 to the input of the MUX 96. The MUX 96 has another input terminal coupled to a bus 102 which supplies the 32 bit signal BUS_DATA_IN as a second input signal to the MUX 96. The select control input to the MUX 96 is coupled by a line 104 to the control signal MODE_GET_NOT_PUT input terminal of the stream controller 14.

The control signal MODE_GET_NOT_PUT, which is generated by the CPU 12 and stored in the status register 185, is supplied to the MUX 96 by the line 104. The signal MODE_GET_NOT_PUT is asserted when the CPU 12 outputs a get request requiring data to be retrieved from memory by the system bus 46. The MUX 96 selects between the two input signals depending on whether or not the control signal MODE_GET_NOT_PUT is asserted. If the signal is asserted, a get request exists and the MUX 96 selects the signal BUS_DATA_IN as its output signal. However, if the signal MODE_GET_NOT_PUT is not asserted, indicating a put request, the longword output by the packer 71 is selected as the MUX's output signal.

The output of the MUX 96 is coupled to the DATA_IN terminals of both the buffers RAM_A 98 and RAM_B 100. In this exemplary embodiment, each buffer 98, 100 contains enough memory to store a maximum of eight longwords.

The WRITE enable input of the buffer RAM_A 98 is coupled by a line 108 to the output of an OR gate 110. A first input to the OR gate 110 is coupled to the output of an AND gate 111 by a line 115. The AND gate 111 has one input coupled to a line 119 which is coupled to the BUS_WRITE_PULSE input terminal of the stream controller 14.

The second input to the AND gate 111 is coupled to the output of a D-type flip-flop 166 (see FIG. 5) by a line 172 which supplies a signal FBUS_USERAMA.

The second input of the OR gate 110 is coupled to the output of an AND gate 113 which has its two inputs coupled to a line 208 and the line 92. In this manner, the AND gate 113 is supplied with the signals PUT_USINGA and PUT_WRITE as inputs.

Accordingly, the OR gate 110, which has its inputs coupled to the outputs of the AND gates 111, 113, has the signal (BUS_WRITE_PULSE * FBUS_USE_RAMA) as a first input and the signal (PUT_USINGA * PUT_WRITE) as a second input. Thus, when BUS_WRITE_PULSE and FBUS_USE_RAMA are both asserted, indicating that data are stable on the bus, and RAM_A 98 is being used then the output of the OR gate 110, a signal WRITE_A, will be high and the write input to RAM_A will be enabled.

In a similar manner, when there is a put being asserted by the CPU 12 and the data are being written to RAM_A, (PUT_USINGA * PUT_WRITE) will be true and the write input to RAM_A 98 will be enabled.

The address input of RAM_A 98 is coupled by a 3 bit bus 112 which supplies the signal ADDR_A as an input signal to the buffer RAM_A 98. The signal ADDR_A indicates to the buffer RAM_A 98 the address where it should store incoming data during a write operation.

The buffer RAM_B 100 has its data input terminal coupled to the output of the MUX 96. Therefore, RAM_B 100 can store the data output by the MUX 96 whenever it receives an asserted WRITE_B signal. The WRITE enable input terminal of RAM_B 100 is coupled by a line 114 to the output of an OR gate 116.

The OR gate 116 has a first input coupled by a line 121 to the output of a first AND gate 125 and a second input coupled by a line 123 to the output of a second AND gate 127. The AND gate 125 has an input coupled to the line 119 and a negated input 172 which supply the input signals BUS_WRITE_PULSE and FBUS_USERAMA respectively. The AND gate 125 outputs the signal (BUS_WRIT_PULSE * !FBUS_USERAMA) which is an input to the OR gate 116.

The second AND gate 127, has a negated input coupled to the line 208 and another input coupled to the line 92 supplying the AND gate 127 with the input signals PUT_USINGA and PUT_WRITE, respectively. The output of the AND gate 127 is the signal (!PUT_USINGA * PUT_WRITE) which is an input to the OR gate 116.

The OR gate 116 is supplied with the first input signal (BUS_WRITE_PULSE * !FBUS_USERAMA) and the second input signal (!PUT_USING * PUT_WRITE). Thus, when the signal BUS_WRITE_PULSE is asserted, indicating that there are data from the system bus 46 which needs to be written to a buffer RAM_A 98 or RAM_B 100, and the FBUS_USERAMA signal is not asserted, indicating that the write will be to RAM_B 100 instead of RAM_A 98, then the WRITE_B signal output by the OR gate 116 will be asserted.

The WRITE_B signal will also be asserted enabling RAM_B 100 whenever the signal PUT_USINGA is not asserted and the signal PUT_WRITE is asserted indicating that the CPU wants to write data to the buffer RAM_B 100 as part of a put request.

The outputs of the buffers RAM_A 98 and RAM_B 100 are coupled by 32 bit busses 118 and 120, respectively, to inputs of a MUX 122. The MUX 122 has a control line 124 as an input. The control line 124 provides a line select signal to the MUX 124. The line select control signal input into the MUX 124 is the signal (MODE_GET_NOT_PUT * GETUSER_RAMA)+(!MODE_GET_NOT_PUT * FBUS_USERAMA).

When the signal (MODE_GET_NOT_PUT * GETUSER_RAMA) is asserted, it indicates that a get request is being serviced and that RAM_A 98 contains the data to be sent to the CPU 12. When the signal (!MODE_GET_NOT_PUT * FBUS_USERAMA) is asserted, it indicates that the system is servicing a put request and that RAM_A 98 contains the data which is to be stored in memory 50 via the system bus 46.

If the select control signal is asserted, it indicates that a get or put request using RAM_A 98 is being asserted and the MUX selects the DATA_OUT signal from RAM_A 98 supplied to the MUX 122 by the bus 118. Otherwise, the select control signal will be low and the MUX 122 will select the DATA_OUT signal from RAM_B 100 as the output signal. The output signal of the MUX 122 is the signal BUS_DATA_OUT.

The BUS_DATA_OUT terminal of the MUX 122 is coupled to the data input bus 130 of a longword to byte/word unpacker 128 and the BUS_DATA_OUT output terminal of the stream controller 14. The longword to byte/word unpacker 128 receives 32 bit data signals from the MUX 122 which are unpacked into byte or word signals which are then supplied to the CPU 12 in response to a get request.

The 32 bit BUS_DATA_OUT signal which is supplied by the bus 130 to the unpacker 128, is divided into 4 byte signals by the bus 130 which splits into 4 eight bit busses 130A, 130B, 130C, 130D. The first and third 8 bit busses 130A and 130C are coupled to inputs on a first and second MUX 172 and 144 while the second and fourth 8 bit busses 130B and 130D are coupled only to input terminals on the second MUX 144.

In addition to having the second and fourth bytes of the BUS_DATA_OUT signal as inputs, the first MUX 132 has '0' as an input signal. Both MUXes 172, 144 have their line select input coupled to a 2 bit bus 136 which supplies the signal LONGWORD_UNPACKER_CONTROL to the MUXes 132, 134.

The MUX 172 generates the upper byte of the 16 bit signal CPU_DATA_OUT while the MUX 144 is responsible for generating the lower byte of the CPU_DATA_OUT signal.

The LONGWORD_UNPACKER_CONTROL signal is generated by the get control state machine 198 (see FIG. 5), and controls which input signal the MUXes 172, 144 will select to create the 16 bit output signal CPU_DATA_OUT. When a longword is being unpacked into a byte, '0' is always selected as the output of the first MUX 172 so that the CPU_DATA_OUT signal will have the second byte padded with zeros while the second MUX 134 will output the byte of data that is to be supplied to the CPU 12. In a series of cycles, each eight bit portion of the longword which is being unpacked is sent out as the lower byte of the word which comprises the CPU_DATA_OUT signal generated during a given cycle. In this manner, it takes four cycles to unpack a longword into bytes while it will take only two cycles to unpack a longword into words.

When a longword is being unpacked into two words, the output of the MUXes 144 and 172 are controlled to select the first and second bytes of the longword respectively, and then to select the third and fourth bytes of the longword for the next word output by the unpacker 128 during a sequence of bus cycles.

The output of the MUXes 172 and 144 are coupled by two eight bit portions 138A and 138B of a 16 bit data bus 138, to the CPU_DATA_OUT terminal of the stream controller 14. Accordingly, the address/data bus 20 which is coupled to the CPU_DATA_OUT terminal of the stream controller supplies the CPU_DATA_OUT signal to the CPU 12.

Figure 5A:
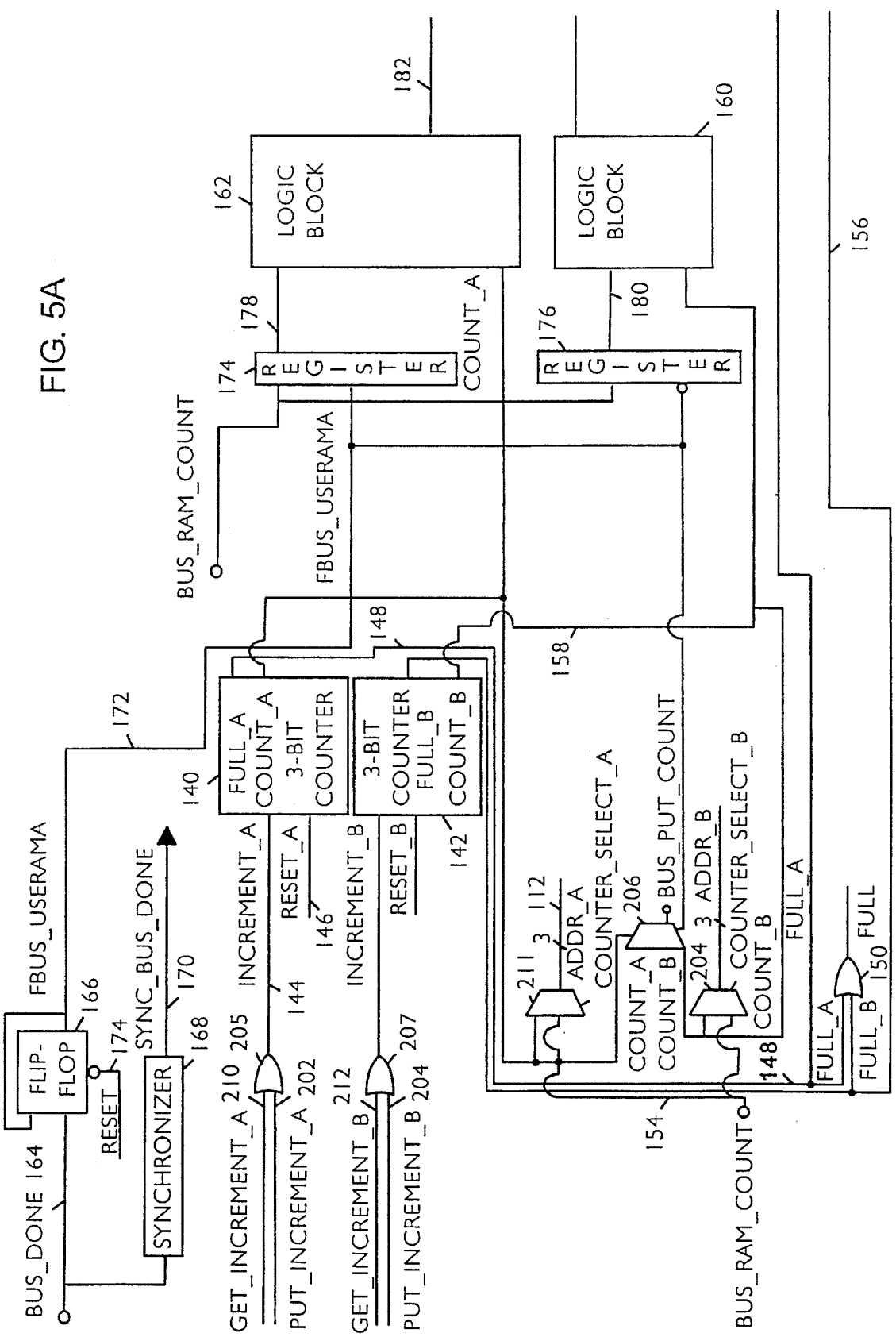
FIG. 5, which comprises the combination of FIGS. 5A and 5B, illustrates a more detailed schematic block diagram of the address counters, control state machines and interface to the request controller of the stream controller of FIG. 2 according to the present invention.

Referring now to FIG. 5, there is illustrated a schematic block diagram of the counters and the put and get control state machines of the stream controller 14. A first 3-bit counter 140, which is used for keeping track of data in RAM_A 98, is coupled to a line 146. The line 146 provides a signal RESET_A which resets the counter 140 to zero when it is asserted. A signal INCREMENT_A is supplied by a line 144 to another input of the counter 140.

The signal INCREMENT_A is output by an OR gate 205. The inputs to the OR gate 205 are coupled by the lines 210 and 202 to the PUT_INCREMENT_A and GET_INCREMENT_A outputs of the get and put control state machines 198, 200, respectively. Thus, whenever the signal PUT_INCREMENT_A or GET_INCREMENT_A is asserted, the INCREMENT_A signal will be asserted.

The counter 140 has a FULL_A output coupled by a line 148 to an input of an OR gate 150 and a corresponding input terminal on the put control state machine 200. Accordingly, both the OR gate 150 and the put control state machine have the FULL_A signal, which is asserted when RAM_A 98 is full of data, as inputs.

The COUNT_A output, of the counter 140, is coupled by a 3 bit bus to a first input of a MUX 211, a first input of a MUX 206 and a second input of a combinational logic block 162. The signal COUNT_A indicates the number of longwords stored in the buffer RAM_A 98 by the CPU 12 during a put request or the number of longwords read by the CPU 12 from the RAM_A 98 during a get operation. A bus 154 couples the second input of the MUX 211 and a second input of another MUX 204 and to the stream controller's input terminal corresponding to the BUS_RAM_COUNT signal. Thus, the BUS_RAM_COUNT signal is supplied as an input signal to both of the MUXes 211, 204. The output of the MUX 211 is coupled to the bus 112 and supplies the signal ADDR_A to the bus 112.

A second 3 bit counter 142, is used for keeping track of the data in buffer RAM_B 100. The second counter 142 has the signal INCREMENT_B and RESET_B applied to its input terminals. The signal INCREMENT_B is the output of an OR gate 207. The OR gate 207 has its inputs coupled by the lines 212 and 204 to the GET_INCREMENT_B and PUT_INCREMENT_B outputs of the get and put control state machines 198, 200 respectively. Thus, whenever the signals PUT_INCREMENT_B or GET_INCREMENT_B are asserted, the signal INCREMENT_B will be asserted.

The output of the second counter 142 is a signal FULL_B and a signal COUNT_B. The output FULL_B is coupled to an input of the OR gate 150 and an input of the put control state machine 200 by a line 156. Thus, both the put control state machine 200 and the OR gate 150 have both the FULL_A and FULL_B signals as inputs. The OR gate 150 outputs the signal FULL which indicates to both the CPU 12 and the bus request controller 32 that both buffers RAM_A 98 and RAM_B 100 are full of data.

The COUNT_B signal, output by the second counter 142, is supplied to the first input of the MUX 204, a second input of the MUX 206, and a second input to a combinational logic block 160 by a 3 bit bus 158. The bus 158 couples the output of the second counter 142 to the first input of the MUX 204 and the second input of the MUX 206.

The MUX 206 has its select line input coupled to the output of the flip-flop 166 by the line 172. Accordingly, the signal FBUS_USERAMA input to the select line of the MUX 206 controls the MUX's output. When the signal FBUS_USERAMA is asserted, indicating that the BUS 46 is writing to or retrieving data from RAM_A 98, the signal COUNT_A will be selected as the output of the MUX 206. However, if the signal FBUS_USERAMA is not asserted, the signal COUNT_B will be selected as the output of the MUX 206. By selecting between its two input signals COUNT_A and COUNT_B, the MUX 206 generates the BUS_PUT_COUNT signal which is output by the stream controller 14.

The MUX 204 has a select control input which is supplied with a COUNTER_SELECT_B control signal (!GET_USERAMA * GET_READ+!PUT_USINGA * PUT_WRITE). The MUX 204 selects between the BUS_RAM_COUNT and the signal COUNT_B to generate the MUX's output signal ADDR_B depending on the value of the COUNTER_SELECT_B control signal. The COUNTER_SELECT_B control signal will be asserted whenever the CPU 12 is reading from or writing to RAMB 100. If the COUNTER_SELECT_B control signal is asserted, it indicates that the COUNT_B signal should be selected as the output signal ADDR_B. However, if COUNTER_SELECT_B is not asserted, it indicates that the bus 46 is the entity which is reading from or writing to RAM_B 100 and thus the BUS_RAM_COUNT will be selected as the output.

While the MUX 204 is responsible for generating the ADDR_B signal, the MUX 211 generates the ADDR_A signal. The MUX 211 selects between the input signal COUNT_A and BUS_RAM_COUNT to create the output signal ADDR_A. The control select input to the MUX 211 is supplied with the COUNTER_SELECT_A control signal (GET_USERAMA * GET_READ+PUT_USINGA * PUT_WRITE). Thus, when the CPU 12 is writing to or reading from RAMA 98 as part of a put or get request, (GET_USERAMA * GET_READ+PUT_USINGA * PUT_WRITE) will be asserted and COUNT_A will be selected as the ADDR_A signal. However, when the signal is not asserted, it indicates that it is the bus 46 and not the CPU 12 which is either reading from or writing to the RAMA and therefore the BUS_RAM_COUNT is selected as the MUX output signal ADDR_A.

A line 164 is coupled to the BUS_DONE signal input terminal of the stream controller 14, an input to a synchronizer 168 and to a clock input terminal of a D-type flip-flop 166. The synchronizer 168 generates the output signal SYNC_BUS_DONE. The output of the synchronizer 168 is coupled by a line 170 to an input of a request controller 184.

The signal BUS_DONE, input into the clock input of the D-type flip-flop 166, indicates when the bus 46 is done writing data to or reading data from the RAM buffer 98 or 100. The BUS_DONE signal is used to enable the flip-flop 166. In this manner, the flip-flop 166 switches between the use of buffer RAMA 98 and RAMB 100 by the bus 46 after every complete write of data from the bus 46 to the buffer RAMA 98 or RAMB 100.

The D-type flip-flop 166 has a negated reset input coupled to the line 174 which in turn is coupled to the RESET signal input terminal of the stream controller 14. Whenever the system 10 is reset, the RESET signal is asserted. When the RESET signal supplied to the flip-flop 166 is asserted, it selects between the buffer RAMA 98 or RAMB 100, which will be written to by the bus request controller 32 the next time a get request is asserted by the CPU 12.

The D-Type flip-flop 166 generates the signal FBUS_USERAMA at its negated output. The signal FBUS_USERAMA controls which buffer RAMA 98 or RAMB 100, will be used to store the data received from the bus request controller 32 during a get request, and which buffer RAMA 98 or RAMB 100 will be used to supply the data which is to be placed on the bus 46 during a put request.

When the signal FBUS_USERAMA is asserted, RAMA 98 will be store data from the bus 46 during a get request or will be used as the source of data to be placed on the bus 46 during a put request. If it is not asserted, !FBUS_USERAMA will be true, and RAMB 100 will be used to store the data received from the bus request controller 32 via the data bus 30C during a get request or as the source of the data to be placed on the bus 46 during a put request.

The output of the D-type flip-flop 166 is coupled by a line 172 back to an input of the flip-flop 166, to the clock input of a first register 174 and to a negated clock input of a second register 176. An input, of each of the registers 174 and 176 is coupled to the bus 154 which, in turn, is coupled to the BUS_RAM_COUNT signal input terminal of the stream controller 14. Therefore, the registers 174, 176 have the BUS_RAM_COUNT as an input signal.

The BUS_RAM_COUNT is a signal which is received from the bus request controller 32 and which indicates the location in the RAM buffer 98 or 100 where the data being supplied to the stream controller 14 from the bus 46 will be stored within the buffer 98 or 100.

When the signal FBUS_USERAMA is asserted indicating a bus transaction involving RAM_A, the clock input of register 174 is enabled. Thus, during a get request using RAMA 98, the register 174 will output the BUS_RAM_COUNT as data are being written to RAMA 98. The output of the register 174 is supplied to the input of the logic block 162 which is used to determine if there are data present in the buffer RAMA 98. When the bus 46 has supplied all the requested data to the buffer, RAMA 98 during a get request, the signal BUS_DONE is asserted causing the signal FBUS_USERAMA to toggle. This in turn, causes the value of the BUS_RAM_COUNT to be latched into the register 174 which will hold this value for comparison to the signal COUNT_A to determine when all the data stored in RAM_A 98 has been sent to the CPU 12 in response to a get request.

During a put request, the signal FBUS_USERAMA is asserted when data stored by the CPU 12 in RAMA 98 is to be placed on the bus 46 and written to the memory 50. As during a get request, when the signal FBUS_USERAMA is asserted, the clock input to the register 174 will be enabled and the signal BUS_RAM_COUNT will be output by the register 174.

The output of the first register 174 is coupled to an input of the first logic block 162. The logic block 162, which is also supplied with the signal COUNT_A as its other input, compares the value of the two signals. If the value indicated by the signal BUS_RAM_COUNT doesn't equal the value indicated by the signal COUNT_A, there are data in the buffer RAMA 98 and the first logic block 162 asserts its output signal DATA_AVAL_A. The output of the first logic block 162 is coupled to an input of the stream interface to request controller 184.

The second register 176 has the BUS_RAM_COUNT signal as an input and functions in the same manner as described above in regard to register 174. However, register 176 has the signal !FBUS_USERA as its clock input signal, which corresponds to use of RAMB 100 for a bus transaction as opposed to RAMA 98. Accordingly, when !FBUS_USERA is asserted the clock input to register 176 will be enabled.

The output of the second register 176 is coupled by a bus 180 to an input to the second logic block 160. The second logic block 160, which has both the BUS_RAM_COUNT signal and the COUNT_B signals as inputs, compares the values represented by both signals. If BUS_RAM_COUNT and COUNT_B aren't equal, the second logic block 160 asserts its output signal DATA_AVAL_B which indicates that there are data present in RAMB 100 which can be read by the CPU 12. The output of the second logic block 160 is coupled to an input of the stream interface to request controller 184 by a line 186.

The controller 184 generates three output signals BUS_REQUEST, RAMA_AVAILABLE, and RAMB_AVAILABLE based on the status of five input signals.

A line 187 which is coupled to the output of the OR gate 334 (see FIG. 6a) and an input to the controller 184 supplies an input signal GET_MORE_DATA, to the controller 184. The signal GET_MORE_DATA indicates that more data should be retrieved from memory by the system bus 46.

The SYNC_BUS_DONE signal is supplied to the request controller 184 by a line 170 indicating to the controller 184 when a bus transaction has been completed.

Another input to the controller 184 is the signal GO. The GO signal is supplied by the line 194 which is coupled to the GO input terminal of the stream controller 14, an input to the put control state machine 200 and an input to the controller 184. The GO signal is asserted by the CPU 12 when the CPU 12 is done writing to the RAM buffers 98, 100 or when the CPU 12 fills one of the buffers with data which is then to be written to the memory 50 as part of a put request by the CPU 12. The GO signal indicates that a bus request should be asserted so that the data in the buffer 98 or 100 can be written to the memory 50 in order to complete the put request asserted by the CPU 12.

Figure 7:
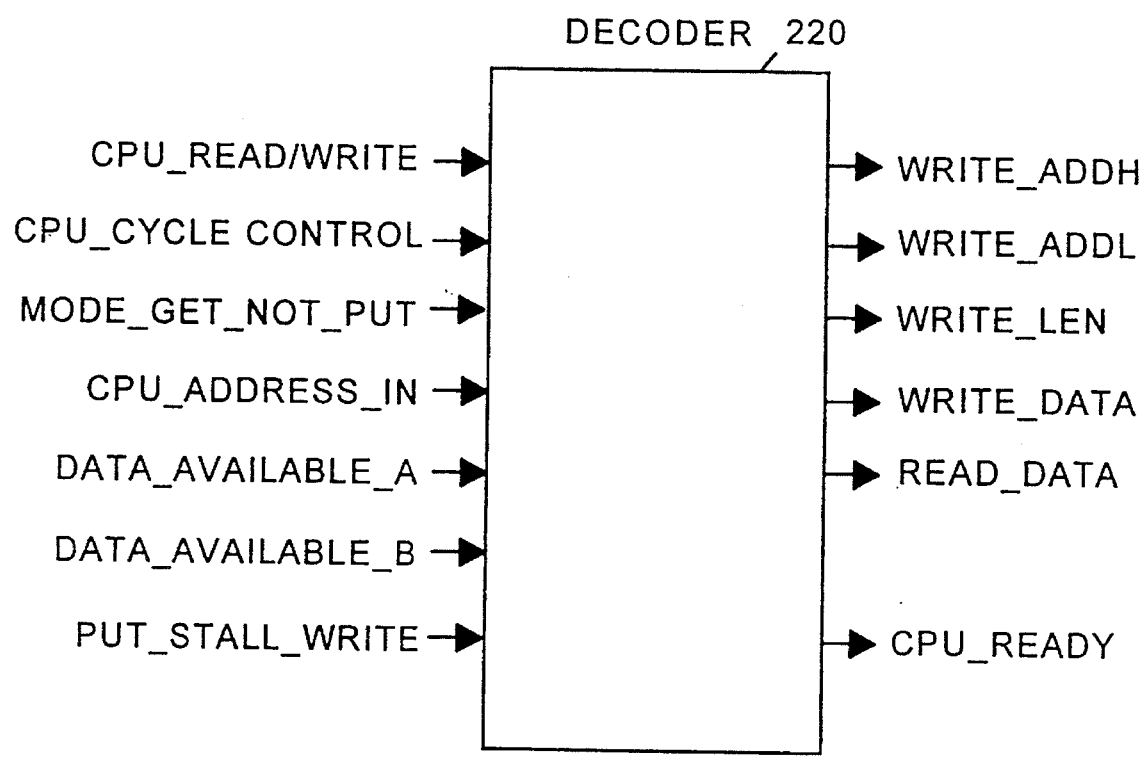
FIG. 7 is a block diagram of the decoder of the stream controller of FIG. 2.

A line 195 couples an input of the controller 184 to the WRITE_LENGTH output of the decoder 220 (see FIG. 7). The WRITE_LENGTH signal indicates to the controller 184, that the CPU 12 is requesting a get operation as will appear.

When any of the input signals GET_MORE_DATA, GO or WRITE_LENGTH are asserted, the controller 184 will assert the output signal BUS_REQUEST. The controller 184 has its BUS_REQUEST output coupled by a line 196 to the BUS_REQUEST output terminal of the stream controller 14 which, in turn is coupled to the bus controller 32 by the control bus 28A. In this manner, the BUS_REQUEST signal indicates to the bus request controller 32, that the system bus is needed to service the stream controller 14.

The remaining two input signals DATA_AVAL_A, DATA_AVAL_B to the controller 184 are generated by the first and second logic blocks 162 and 160 respectively, as described above. The controller 184 uses these two signals to determine if buffers RAMA 98 and RAMB 100 are available. If the buffer 98 or 100 contains any data then it is unavailable until that data are read and the DATA_AVAL_A or DATA_AVAL_B signals are deasserted respectively.

The controller 184 asserts the output signal RAMA_AVAILABLE if the signal DATA_AVAL_A is not asserted indicating that the buffer RAMA 98 is empty. In the same manner, the signal RAMB_AVAILABLE will be asserted only if the signal DATA_AVAL_B is not asserted.

The controller 184 has the two RAMA_AVAILABLE and RAMB_AVAILABLE outputs coupled by two lines 188 and 190 respectively, to two inputs to the put control state machine 200. Accordingly, the state machine 200 is supplied with the RAMA_AVAILABLE and RAMB_AVAILABLE signals.

The put control state machine 200 has several inputs and outputs. As stated previously, the two lines 188, 190 provide the state machine with the input signals RAMA_AVAILABLE and RAMB_AVAILABLE.

A line 192 which couples the MODE_STREAM_WIDTH input terminal of the stream controller 14 to an input on the state machine 200. Accordingly, the MODE_STREAM_WIDTH signal is supplied as an input signal to the state machine 200. The signal MODE_STREAM_WIDTH indicates to the state machine 200 whether bytes of words of data are being sent to the packer 71 during a put request. If the signal MODE_STREAM_WIDTH is asserted it indicates that words of data are being sent to the packer 71. The state machine 200 uses this information to assert the INCREMENT signals after every two cycles if words are being packed, during the transfer of data from the CPU 12 to the packer 71. However, if bytes are being packed, as opposed to words, the increment signal will be asserted only after four cycles since it will take four cycles to transfer enough data from the CPU 12 to the packer 71 to fill an entire longword.

The signal WRITE_DATA is supplied to the put control state machine 200 from the decoder 220 by a line 191. The WRITE_DATA signal indicates to the put control state machine 200 when data are being written to the RAM 98, 100 by the CPU 12 and is used to generate the INCREMENT signals accordingly.

The line 194 couples the GO input terminal of the stream controller 14 to an input of the state machine 200 supplying the state machine 200 with the GO signal output by the CPU 12.

The remaining two input signals to the put control state machine 200 are the signals FULL_A and FULL_B which are output by the counter 140, 142 and supplied by the lines 148 and 156 to the corresponding inputs to the put control state machine 200. The signals FULL_A and FULL_B are asserted by the counters 140, 142 when eight longwords have been written to the buffer RAMA 98 or RAMB 100 completely filling the available RAM in the given buffer.

Based on the values of the above six input signals, RAMA_AVAILABLE, RAMB_AVAILABLE, MODE_STREAM_WIDTH, GO, FULL_A, and FULL_B, the put control state machine 200 generates the following six output signals PUT_INCREMENT_A, PUT_INCREMENT_B, LONGWORD_PACKER_CONTROL, PUT_STALL_WRITE, PUT_USINGA, and PUT_WRITE.

The PUT_INCREMENT_A output is coupled by the line 202 to a second input of the OR gate 205. A line 212 couples the PUT_INCREMENT_B output of the state machine 200 to the second input of the OR gate 207. During a write by the CPU 12 to the buffer RAM_A 98 or RAM_B 100 the PUT_INCREMENT_A and PUT_INCREMENT_B signals are used to increment the corresponding counter 140, 142 respectively to generate the address of RAM_A 98 or RAM_B 100 to be written to as the case may be.

Another output of the state machine 200 is the signal LONGWORD_PACKER_CONTROL which is provided to the byte/word to longword packer 71 by a bus 94. The bus 94 couples the LONGWORD_PACKER_CONTROL to the control input of the decoder 82. The LONGWORD_PACKER_CONTROL signal is generated by the put control state machine 200 to enable the MUXes 74, 76, 78, and 80, over a number of cycles as described above, to pack the bytes or words from the CPU 12 into longwords which are to be written to the memory 50.

The PUT_STALL_WRITE signal output by the state machine 200 is supplied to a decoder 220 by a line 206 which couples the output of the state machine 200 to the input of the decoder 220. The PUT_STALL_WRITE signal is asserted by the put control state machine 200 whenever there is a put request being asserted and the buffers RAM_A 98 and RAM_B 100 are full or unavailable for storing data from the CPU 12. IF the signal PUT_STALL_WRITE is asserted, the decoder 220 will not assert the CPU_READY signal thus preventing the CPU 12 from writing to the stream controller 14, 16 or 18 during a put operation until a RAM is available and the PUT_WRITE_STALL signal is de-asserted by the state machine 200.

The line 208 is coupled to the PUT_USINGA output of the state machine 200. Thus, the signal PUT_USINGA is supplied to the line 208 and serves to indicate which buffer 98, 100 the put control state machine 200 has selected to store the data from the CPU 12.

The put control state machine 200 also generates the signal, PUT_WRITE, which indicates when a write to either RAM_A 98 or RAM_B 100, associated with a put operation, is authorized. The PUT_WRITE output of the put control state machine 200 is coupled to the line 92. for use, with the PUT_USINGA signal, to generate the WRITE_A and WRITE_B signals, as described above.

A get control state machine 198 generates the signals used to increment the two counters 140, 142 and to control the longword to byte/word unpacker 128. The get control state machine 198, has several input and output signals.

The CPU_READ_DATA signal is supplied by a line 216 which is coupled to a first input of the state machine 198. The line 192 is coupled to the second input of the state machine 198. Accordingly, the signal MODE_STREAM_WIDTH which is present on the line 192 is the second input signal to the state machine 198.

The third and fourth input signals DATA_AVAL_A and DATA_AVAL_B are provided to the get control state machine 198 by the lines 182 and 186 which are coupled to the third and fourth inputs of the state machine 198, respectively.

The RESET signal is supplied to the state machine 198 by the line 174 which is coupled to the state machines fifth input. The remaining input to the state machine 198 is the system clock signal which is provided by a line 218 which is coupled to the sixth input of the get control state machine 198.

The state machine 198 generates several output signals. The GET_INCREMENT_A output is coupled by the line 210 to a first input of the OR gate 205. A line 212 couples the GET_INCREMENT_B output of the state machine 198 to a first input of the OR gate 207. During a read by the CPU 12 associated with a get operation, the GET_INCREMENT_A and GET_INCREMENT_B signals are used to increment the corresponding counter 140, 142 respectively to generate the address of RAM_A 98 or RAM_B 100 to be read. Since each longword being read must be unpacked and sent to the CPU in the form of bytes or words, the get state machine 198 only generates an INCREMENT signal after the longword which was read has been unpacked over a number of cycles.

It takes four cycles to unpack a longword into bytes with one byte of data being sent to the CPU 12 during each cycle. Therefore, if the signal MODE_STREAM_WIDTH is not asserted, indicating that the data are unpacked into bytes, an INCREMENT signal will be asserted only once every four cycles. However, if the signal MODE_STREAM_WIDTH is asserted, it indicates that the data are to be unpacked into words requiring only two cycles to unpack each longword. Thus, when the CPU 12 is being sent words of data, the INCREMENT signal is asserted by the get control state machine 198 after every two cycles until all the data are read and unpacked from the buffer 98 or 100.

The third output of the state machine 198 is the signal LONGWORD_UNPACKER_CONTROL which is provided to the longword to byte/word unpacker 128 by a bus 136. The bus 136 couples the LONGWORD_UN-PACKER_CONTROL to the control input of the unpacker 128. The LONGWORD_UNPACKER_CONTROL signal is generated by the get control state machine 198 to control the selection of the outputs of the MUXes 132 and 134, over a number of cycles as described above, to unpack the longwords read from the buffer 98 or 100 into the bytes or words of data requested by the CPU 12.

The get control state machine 198 is also responsible for selecting between RAM_A 98 and RAM_B 100 to store the data retrieved from the memory 50 during a get operation until it can be unpacked and sent to the CPU 12. When data is available in RAMA 98 or RAMB 100 as the result of a get request, the get control state machine 198 sets the DATA_AVAL bit in the status register 185 to indicate to the CPU 12 that the requested data have been retrieved and stored in one of the buffers 98, 100 in response to a get request.

Figure 6A:
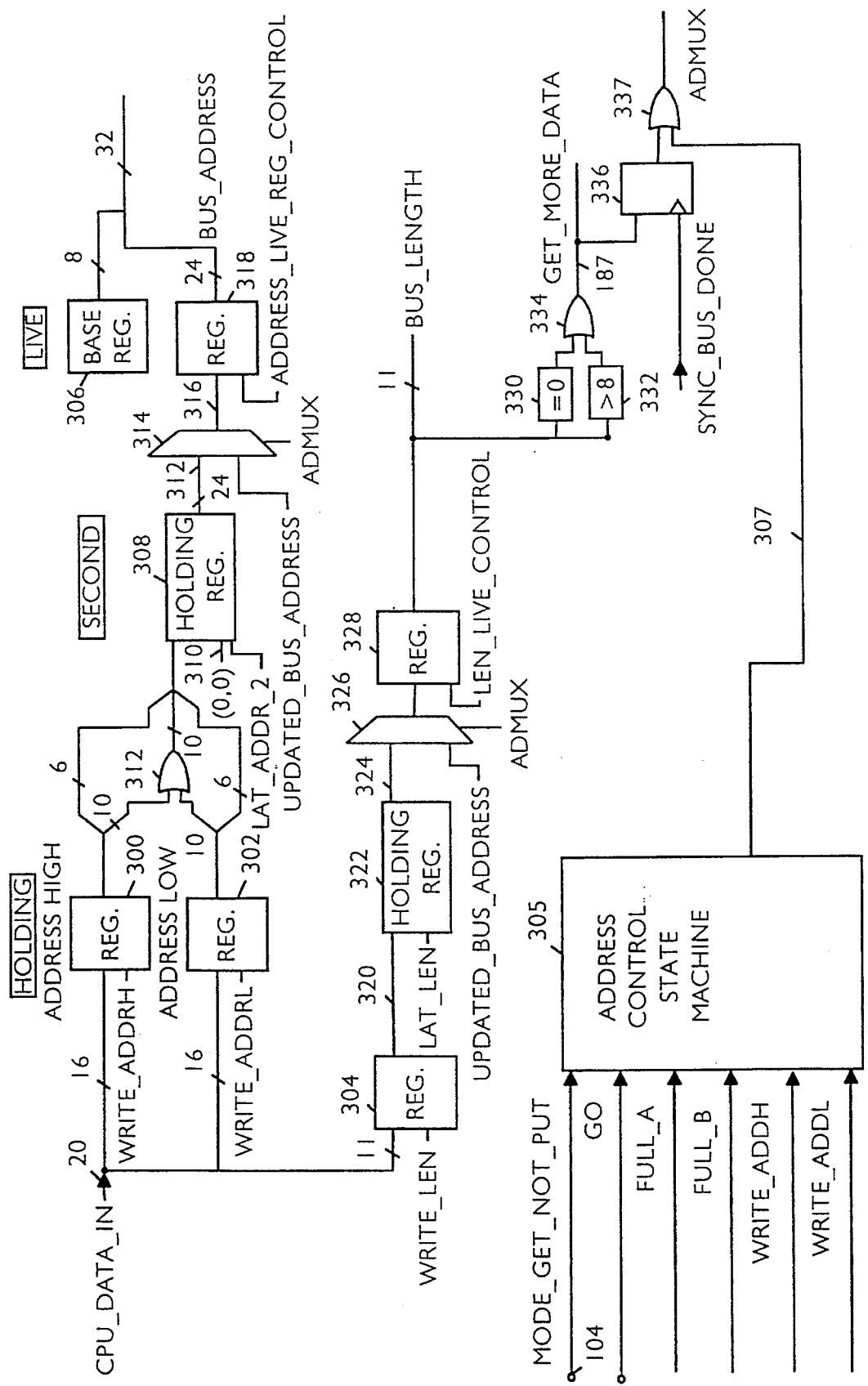
FIG. 6a is a block diagram which illustrates the address register arrangement of the stream controller of FIG. 2.

Referring now to FIG. 6a, there is illustrated a block diagram for the address and data length register arrangement of the stream controller 14, 16, 18 of the present invention. As described above, the CPU 12 includes a 16 line address data bus 20, yet must generate a 32 bit address for access to the bus address space. In order to accommodate the disparity between local address bus size and the address size of the bus address space, two address registers 300, 302 are utilized to couple the 16 bit CPU generated addresses to the address lines of the bus 46.

The address register 300 is used to store certain high order bits of the 32 bit bus address and is referred to as the high register. The address register 302 is used to store certain low order bits of the bus address and is referred to as the low register. The 16 bit address/data bus 20 from the CPU 12 is coupled to each of the high address register 300 and the low address register 302 and to a data length register 304. Each of the high address register 300 and the low address register 302 is a 16 bit register.

Preselected bits (e.g. 10) of each of the two 16 bit registers 300, 302 are overlapped to provide a total of 22 bits of the 32 bit bus address. In this example, longword access is described. Thus, the two low order bits of the address are set to zero values to accommodate the longword access (i.e., the individual bytes of each longword of the addressable space cannot be separately accessed). The two lowest order zero bits of the 32 bit bus address are directly input to a 24 bit address holding register 308, as shown at 310. The remaining bits of the 32-bit address are supplied by a 8-bit base register 306. Corresponding bits that overlap in the high and low registers 300, 502 are logically combined in a boolean operation (e.g., logically ORed together, as for example by an OR logic circuit 312).

In this manner, the binary values for certain overlapped bits can be set in one of the registers 300, 302 so that the value of the combined bit is either set by the value of the other overlapped bit or fixed regardless of the value of the other overlapped bit. In the example of a logical OR, when a preselected overlapped bit in the high register 300 is set to a logical 1, the logical combination of the overlapping high and low bits will be a logical 1 regardless of the value of the corresponding overlapped bit of the low register 302 since the logical 1 provided by the high order bit results in an ORed logical 1 whether the other OR input of the respective overlapped low order bit is a logical 1 or logical zero.

On the other hand, when the preselected overlapped bit in the high register 300 is set to a logical zero, the logical combination of the overlapping high and low bits will be a logical 1 when the respective low order bit is a logical 1 and will be a logical zero when the respective low order bit is a logical zero due to the logic inherent in an OR combination.

As should be understood, the value of combined bits can also be fixed by setting the values of overlapped low bits to logical 1's or zeros so that the values of corresponding overlapped high order bits are either irrelevant or determine the value of the combined bit. Thus, the overlapping of certain bits of the two address registers 300, 302 provides flexibility in the number of bits in each of the high and low registers 300, 302 used to define a complete 32 bit bus address.

For example, having determined the precise number of overlapped high order bits required to specify a preselected area of the total address space, the remaining overlapped high order bits are each always set to logical zeros. Moreover, the most significant n overlapped low order bits corresponding to the number of high order bits determined to be necessary to specify the preselected area of the total address space are also set to logical zeros. The remaining low order bits will then determine an offset within the preselected memory area defined by the precise number of bits of the high register 300. The size of a next preselected area of the address space can be easily changed by increasing or decreasing the number n of overlapped high order bits.

Moreover, the overlapped high order bits can be used to alias addresses defined by the bit values loaded into the low register 302 by always setting certain ones of the overlapped high order bits to logical 1's. The values of the combined overlapped bits corresponding to the high order bits set at logical 1 will remain logical 1's, as described above, regardless of the values loaded into the low register 302 by the CPU 12. In this manner, the address generating software of the CPU 12 can be used to generate bit values for only the low register 302 regardless of what values are loaded into the high register 300 and with the overlapped high order bits always set to logical 1's controlling the combined bit values for those bits. The remaining low order bits of the low register 302 will define an offset in the upper portion of the address segment defined by the high order bits not always set to logical 1's. Thus, the address generating software need not be cognizant of the number of bits required to define an offset.

Thus, the multiple address register arrangement provides a highly flexible scheme for generating addresses in a large memory space. The size of the preselected memory area can be set as desired so that the CPU 12 need only perform a single register load to the low address register 302 during reads and writes to the preselected area, once the appropriate bits of the high register 300 are set by the CPU 12. In addition, the register arrangement can be used to alias addresses so that the CPU 12 can address memory blocks of variable size while continuing to use the addressing scheme of the original address space.

Figure 6B:
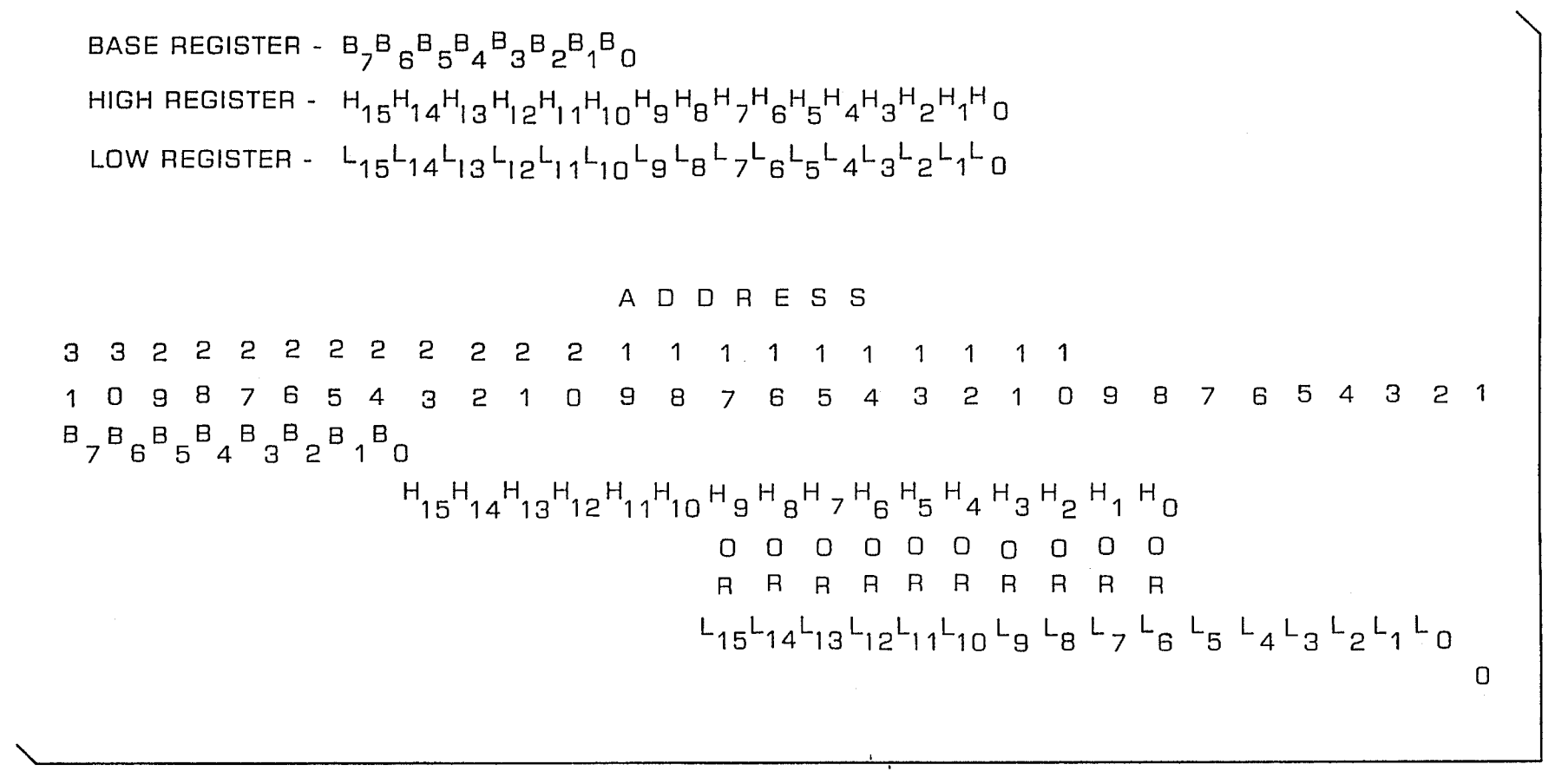

Referring to FIG. 6b, bits $H_9$-$H_0$ in the high address register 300 are logically ORed with corresponding bits $L_{15}$-$L_6$ in the low address register 302.

The base register 306 is set to a constant value equal to the eight high order address bits of a 16 Mbyte portion of the addressable space defined by the 32 bit bus address. A 64 Kilolongword address space can be efficiently accessed by the CPU 12 by loading the bits $H_{15}$-$H_{10}$ of the high address register 300 with the appropriate address of the selected 64 Kilolongword address space. Bits $H_9$-$H_0$ are loaded by the CPU 12 with binary zero values. Now the entire low address register 302 can be used by the CPU 12 to access any longword offset in the 64 Kilolongword address space without changing the high address register 300.

A 64 longword address space can also be easily accessed using the registers 300, 302. First, the entire high address register 300, bits $H_{15}$-$H_0$, is loaded with the appropriate address of the selected 64 longword address space. As long as bits $L_{15}$-$L_6$ are set to binary zero values, the bits $L_5$-$L_0$ of the low address register 302 can be used to access any longword offset in the 64 longword address space without changing the high address register 300.

It will be appreciated by one having skill in the art that the addressing scheme shown in FIG. 6b may be used to access portions of the addressable space having other sizes. The shown addressing scheme can be used for any segment size for the addressable space from $2^6$ (64) longwords up to $2^{16}$ (65,536) longwords in length provided the length of the segment is a power of two and appropriate bits of the high register 300 are set at constant values, e.g., logical zeros when OR gates are used. Also, different levels of overlapping between the two (or more) registers can be used to achieve desirable results. Using the two registers 300, 302, processor time is saved since only the low address register 302 need be loaded with new address data by the CPU 12 when subsequently accessing the same segment of the addressable space specified by the high and base address registers 300, 306.

Other logical functions can be used to combine overlapping bits besides an OR function. For instance, logically ANDing overlapping bits will achieve similar results. Referring to FIG. 6b, when accessing a selected 64 Kilolongword address space, bits $H_{15}$-$H_{10}$ are again loaded with the appropriate high order address bits that point to this selected address space. Bits $H_9$-$H_0$ are loaded with binary 1 values which, in turn, are logically ANDed with overlapping bits $L_{15}$-$L_6$ of the low address register. Now, the entire low address register 302 can be used to access any longword offset in the 64 Kilolongword address space without changing the high address register 300.

The high register 300 can also be used to alias addresses, as described above, to cause accesses to the same location for two or more variations of the low register 302. Referring again to FIG. 6b, the base register 306 is set to a constant value equal to the eight high order address bits of a 16 Mbyte portion of the addressable space that includes 2 Megalongwords of space available to the device. Bits $H_{15}$-$H_{10}$ of the high address register 302 are first loaded with the appropriate address of a selected 32 Kilolongword address space. Bit $H_9$ is set to a binary 1 value, and bits $H_8$-$H_0$ are loaded with binary zero values.

Because bit $H_9$ of the high address register 300 is set to a binary 1 value, two binary values for the low address register will access the same location (i.e., Bit $L_{15}$ becomes a "don't care" variable).

This type of access to the same location has applications in computer network systems. For instance, a device may need to write to a set of locations in a cyclical manner. Rather than reload the low address register 302, it can be automatically incremented provided that the overlapping part of the high register 300 has the appropriate binary 1 values. Referring back to FIG. 6b, the base register 306 and bits $H_{15}$-$H_{10}$ of the high register 300 are set to the appropriate values to specify a 64 Kilolongword space that includes the aforementioned cycled series of locations (e.g., 64 longwords in length). Bits $H_9$-$H_0$ are set to binary 1 values. Now, the combination of the base and high registers 306, 300 should point to the first location of the cycled series of locations. Incrementing the low address register 302 will cause the addresses to cycle through aforementioned series of locations in the 64 longword space.

Referring once again to FIG. 6a, the logically combined 10 bits ($H_9$-$H_0$ and $L_{15}$-$L_6$) of the high and low registers 300, 302 are concatenated and coupled, with the two lowest order zero bits (310), to an input of the holding register 308. The output of the holding register 308 is coupled by a 24 bit bus 312 to a first input of a MUX 314. A second input of the MUX 314 is coupled to the UPDATED_BUS_ADDRESS signal input to the stream controller 14 by the bus request controller 32 (see FIG. 2). An output of the MUX 314 is coupled by a bus 316 to the input of a live address register 318. An output to the live address register 318 is concatenated with an output of the bus register 306 to provide the BUS_ADDRESS output of the stream controller 14 for input to the bus request controller 32 (see FIG. 2).

As indicated, the bus 20 is also coupled to the bus length register 304. The output of the bus length register 304 is coupled by a bus 320 to a bus length holding register 322 having an output coupled by a bus 324 to a first input to a MUX 326. A second input of the MUX 326 is coupled to the UPDATED_BUS_LENGTH signal output to the stream controller 14 by the bus request controller 32 (see FIG. 2). An output of the MUX 326 is coupled to an input of a live bus length register 328. An output of the live bus length register 328 provides the BUS_LENGTH output of the stream controller 14 for input to the bus request controller 32 (see FIG. 2).

Referring now to FIG. 7, there is illustrated a decoder 220 provided in the stream controller 14. The decoder 220 receives the CPU_READ/WRITE, CPU_CYCLE_CONTROL, MODE_GET_NOT_PUT and CPU_ADDRESS_IN signals input by the CPU 10 to the stream controller 14 (see FIG. 2). The decoder 220 also receives the DATA_AVAL_A and data_aval_b signals output by the logic blocks 162, 160, respectively and the PUT_STALL_WRITE signal output by the put control state machine 200 (see FIG. 5). The decoder 220 decodes these signals to provide WRITE_ADDH, WRITE_ADDL, WRITE_LEN, WRITE_DATA, READ_DATA and CPU_READY output signals.

In the operation of the system, the CPU 12 asserts the CPU_CYCLE_CONTROL signal at the beginning of each read or write operation in respect of the registers of the stream controller 14, so that the stream controller 14 is aware that a CPU read or write register cycle is underway.

The CPU_READ/WRITE signal is used by the CPU 12 to indicate to the decoder 220 of the stream controller 14 whether a read or write operation is to occur in the cycle. The MODE_GET_NOT_PUT signal is asserted by the CPU when it is initiating a get request to the stream controller 14. The CPU_ADDRESS_IN signal inputs the address of the register of the stream controller 14 that the CPU 12 is writing to or reading from, as the case may be.

The DATA_AVAL_A and DATA_AVAL_B signals input to the decoder 220 indicate whether RAM_A 98 and/or RAM_B 100 contain data and therefore, whether either RAM is available to receive data from the CPU 12.

When the CPU 12 indicate a CPU cycle to write data to the high address register 300, as indicated by the CPU_CYCLE_CONTROL, CPU_READ/WRITE and CPU_ADDRESS_IN signals, the decoder 220 will output the WRITE_ADDH signal. As illustrated in FIG. 6a, the WRITE_ADDH signal is coupled to an enable input of the high address register 300 to latch the high address bits ($H_{15}$-$H_0$) into the register 300, via the bus 20.

Similarly, when the CPU 12 indicates a CPU cycle to write data to the low address register 302, as indicated by the CPU_CYCLE_CONTROL, CPU_READ/WRITE and CPU_ADDRESS_IN signals, the decoder 220 will output the WRITE_ADDL signal which is coupled to an enable input of the low address register 302, as illustrated in FIG. 6a. This will latch the low order bits ($L_{15}$-$L_0$) into the register 302 via the bus 20.

The WRITE_LEN signal is asserted by the decoder 220 when the CPU_READ/WRITE, CPU CYCLE_CONTROL and CPU_ADDRESS_IN signals indicate a CPU cycle to write a length into the length register 304 via the bus 20. The WRITE_LEN signal is coupled to an enable input of the register 304 (see FIG. 6a) to latch the length value on the bus 20 into the register 304. The length value written into the length register 304 by the CPU 12 indicates the number of longwords to be fetched for the CPU 12 over the system bus 46 during a get operation. The number of longwords is fetched, starting with the longword stored at the address written into the registers 300, 302 and continuing at contiguous longword locations, in eight longword blocks, until the number of longwords originally indicated in the length register 304 has been fetched, as will appear. The bus length register 304 is only written during a get operation.

The WRITE_LEN signal is also input to the interface to the request controller 184 (see FIG. 5) to provide an assertion of the BUS_REQUEST signal, as described above.

The PUT_STALL_WRITE signal received from the put control state machine 200 via line 206 (see FIG. 5) is decoded by the decoder 220. If the PUT_STALL_WRITE signal is asserted, the stream controller 14, 16, 18 will not assert the CPU_READY signal which is supplied to the CPU 12. The CPU_READY signal is a hand shaking signal for the CPU 12, to indicate to the CPU 12 that a register read or write can proceed. Inasmuch as the assertion of the PUT_STALL_WRITE signal indicates a RAM full condition, the response of the decoder 220 to the PUT_STALL_WRITE in not asserting the CPU_READY signal prevents the CPU 12 from writing to the stream controller 14 during a put operation until a RAM is available and the PUT_WRITE_STALL signal is de-asserted.

When the CPU_READY signal is not asserted, the CPU 12 stalls the transaction with the stream controller 14, 16, or 18 leaving the address and data information on the address/data bus 20, until such time as the CPU 12 receives a CPU_READY signal from the stream controller 14, 16, or 18 indicating that the stream controller 14, 16 or 18 is ready to continue servicing the request. The WRITE_DATA signal is asserted by the decoder 220 when the CPU_READ/WRITE, CPU_CYCLE_CONTROL and CPU_ADDRESS_IN signals indicate a CPU cycle to write data to data registers 74-80. The WRITE_DATA signal is input to the put control state machine 200 (see FIG. 5) for control of the PUT_INCREMENT_A, PUT_INCREMENT_B and LONGWORD_PACKER_CONTROL outputs of the state machine 200, as described above.

The READ_DATA signal is asserted by the decoder 220 when the CPU_READ/WRITE, CPU_CYCLE_CONTROL and CPU_ADDRESS_IN signals indicate a CPU cycle to read data from the stream controller 14. The READ_DATA signal is input to the get control state machine 198 (see FIG. 5) for control of GET_INCREMENT_A, GET_INCREMENT_B and LONGWORD_UNPACKER_CONTROL outputs of the state machine 198, as described above.

Figure 8:
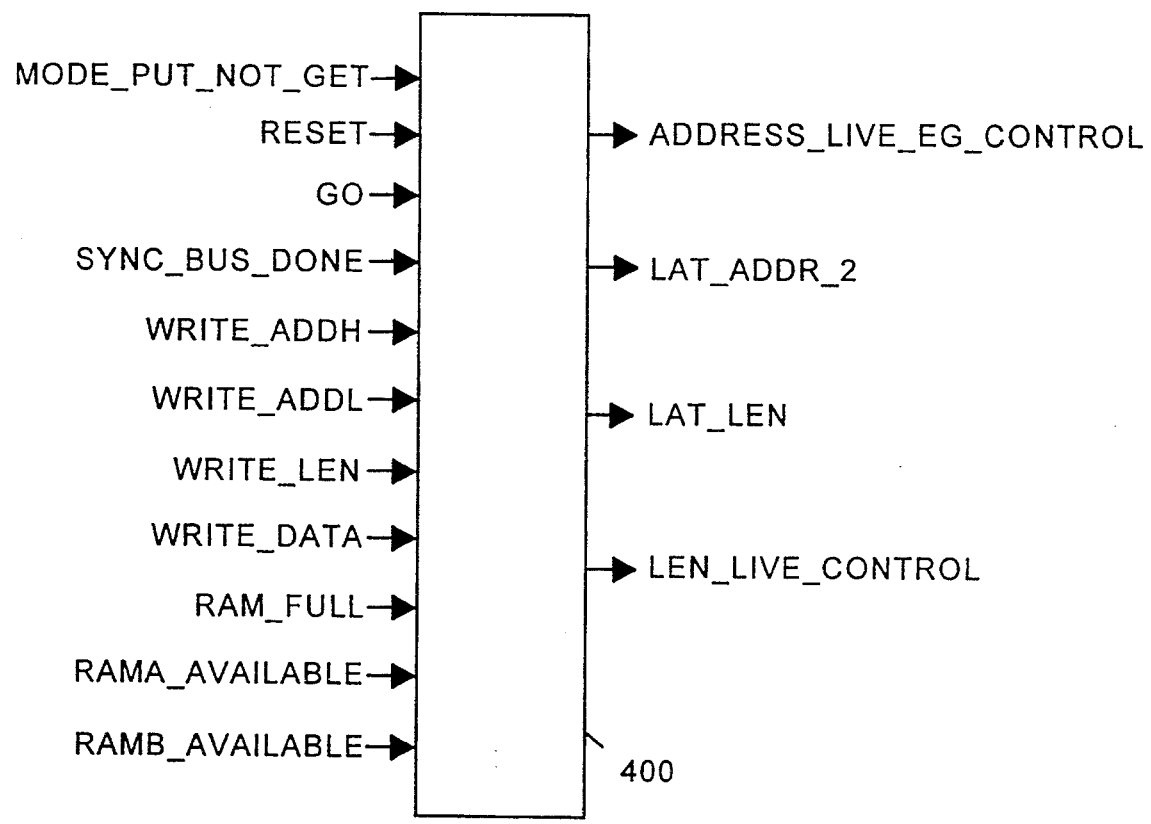
FIG. 8 is a block diagram of the address and length control synchronous finite state machine of the stream controller of FIG. 2.

Referring now to FIG. 8, there is illustrated an address and length control synchronous finite state machine 400. The state machine 400 is used to latch address and length data from the registers 300, 302, 304 into the holding and live registers 308, 322, respectively. The state machine 400 receives as inputs the MODE_GET_NOT_PUT, GO, SYNC_BUS_DONE, WRITE_ADDH, WRITE_ADDL, WRITE_LEN, WRITE_DATA, RAM_FULL, RAMA_AVAILABLE and RAMB_AVAILABLE signals to generate ADDRESS_LIVE_REGISTER_CONTROL, LAT_ADDR_2, LAT_LEN and LEN_LIVE_CONTROL output signals.

As illustrated in FIG. 6a, the LAT_ADDR_2 signal is coupled to an enable input of the holding register 308, the ADDRESS_LIVE_REGCONTROL signal is coupled to an enable input of the live address register 318, the LAT_LEN signal is coupled to an enable input of the holding length register 322 and the LEN_LIVE_CONTROL signal is coupled to an enable input of the live length register 328.

The state machine 400 interprets the various input signals to latch the address and data length values written into the registers 300, 302, 304 respectively, to the respective holding and lives registers 308, 324, 318, 328 so that address and length information for several put or get operations can be pipelined within the stream controller 14. Thus, e.g., the CPU 12 can write a bus address into the registers 300, 302 while a current get or put operation is proceeding in respect of another address loaded in the live register 318. The various input signals to the state machine 400 provide the state machine 400 with all the information necessary to latch address and length data from the holding registers to the live registers in synchronization with CPU writes to the registers and the completion of system bus transactions relating to the address and length data stored in the live registers 318, 328.

Referring once again to FIG. 6a, the BUS_LENGTH signal output of the live register 328 is coupled to each of a first logic block 330 and a second logic block 332. The first logic block 330 is arranged to assert a signal when the value in the live length register 328 is equal to zero. In the present embodiment, a zero value in the length register 328 is interpreted as n+1 bits set at logical ones wherein n equals the number of bits stored in the register 328. The second logic block 332 is arranged to assert a signal when the valve in the live length register 328 is greater than eight longwords in a get operation. The outputs of the logic blocks 330, 332 are input to an OR gate 334, the output of which provides the GET_MORE_DATA signal on line 187, which is coupled to the interface to the request controller 184 (see FIG. 5), for generation of the BUS_REQUEST signal, as described above.

The GET_MORE_DATA signal is also coupled to a data input of a D-Type flip flop 336. The SYNC_BUS_DONE signal on line 170 (see FIG. 5) is coupled to the clock input of the flip flop 336. Thus, upon completion of each bus transaction on the system bus 46, the value of the GET_MORE_DATA signal is clocked through the flip flop 336 to its output. The output of the flip flop 336 is coupled to the input of an OR gate 337 which outputs an ADMUX signal that is coupled to a select control of each of the MUX's 314, 326. In this manner, whenever the GET_MORE_DATA signal is asserted, it will select the UPDATED_BUS_ADDRESS and UPDATED_BUS_LENGTH inputs of the respective MUX 314, 326, for input to the live registers 318, 328, respectively. Thus, whenever data transfers involving more than the eight longword capacity of the RAMS 98,100 are required, the GET_MORE_DATA signal is asserted and the UPDATED_BUS_ADDRESS and UPDATED_BUS_LENGTH values provided by the bus request controller 32 via the bus protocol, as described above, are selected and input into the live registers 318, 328, respectively.

An address control state machine 305 is supplied with the signal MODE_GET_NOT_PUT, GO, FULL_A, FULL_B, WRITE_ADDH and WRITE_ADDL. The put address control state machine 305 detects when there is a data write to a stream controller 14, 16, or 18 by monitoring the WRITE_ADDH and WRITE_ADDL signals output by the decoder 220. The output of the address control state machine 305 is coupled to an input of the OR gate 337 and thus controls the assertion of the signal ADMUX.

During a put request, the CPU 12 supplies the starting address in memory where the data are to be stored. However, when a put request involves more than 8 longwords and therefore multiple bus transactions, the signal ADMUX will be asserted by the control state machine 305 via the OR gate 337 at the end of each bus transaction causing the UPDATED_BUS_ADDRESS information to be selected and input into the live registers 318, 328 as described above. The signal GO which is asserted by the CPU 12 when it has finished writing to the RAMs 98, 100 is used by the state machine 305 in determining when all the data has been written to the RAMs 98, 100. The signals FULL_A and FULL_B which are asserted during a put request whenever a RAM 98, 100 is filled with data from the CPU 12, indicate to the control state machine 305 that multiple bus transactions are being used to service a put request. Thus, the control state machine 305 is made aware that multiple bus transactions are being used to service a put request indicating that the signal ADMUX should be asserted at the end of the bus transaction. With the assertion of the signal ADMUX, the UPDATED_BUS_ADDRESS will be used in the next bus transaction as the starting address in the memory 50 where the data are to be stored. Accordingly, the use of the UPDATED_BUS_ADDRESS permits multiple bus transactions to occur, in order to service a put request, while requiring the CPU 12 to transmit only an initial starting address at the beginning of the put request.

From the above description, it is apparent that the apparatus of the present invention provides a direct data path from both the CPU 12 and the bus 46 to the buffers RAMA 98 and RAMB 100.

During a put request, the CPU 12 has a direct data path to the buffers RAMA 98 and RAMB 100 via the byte/word to longword packer 71 and MUX 96. Also, during a get operation, the CPU 12 has a direct data path to the RAMs 98, 100 via the MUX 122 and the longword to byte/word unpacker 128 which supplies the data from the buffers RAMs 98, 100 to the CPU address/data bus.

The CPU 12 maintains direct control of the generation of the addresses used to reference the RAMs 98, 100 during a CPU read or write operation by means of the put and get control state machines 200, 198. In response to input signals from the CPU 12, the state machines 200, 198, produce the INCREMENT signals used by the counters 140, 142 to generate the addresses for RAMA 98 or RAMB 100.

In this manner, the CPU 12 has both a direct data path to transfer data to and from the RAMs 98, 100 and can do so at the CPU's normal operating speed since the CPU 12 also controls the generation of the addresses for accessing RAMA 98 or RAMB 100 during a CPU read or write transaction with the stream controller 14, 16, 18.

The bus 46, like the CPU 12 has a direct data path to the RAMs 98, 100 during portions of both the put and get operations when data transfers between the bus 46 and the RAMs 98, 100 are required. The bus 46 is coupled to the data in terminals of RAMA 98 and RAMB 100 by the bus 102 and the MUX 96 during data transfers to the RAMs 98, 100 which occur during get operations. During a put operation, the bus 46 has a direct data path to the RAMs 98, 100 via the MUX 122 and the bus 126 which supplies the BUS_DATA_OUT signal.

Address information for writing to or reading from the RAMs 98, 100 is supplied by the bus request controller 32 via the signal BUS_RAM_COUNT. The BUS_RAM_COUNT is supplied by the bus request controller 32 to the address inputs of RAMA 98 and RAMB 100 via the MUXes 211, 204 and the address data lines 112, 114. In this manner, during a bus transaction with the RAMs 98, 100, the bus 46 can transfer data at its normal data transfer rate which may be different than the CPU data transfer rate.

Accordingly, because both the CPU 12 and the bus 46 have direct data paths to and from the buffers RAMs 98, 100 and they each control the addressing of the buffers during data transfer operations in which they are involved, the stream controller 14, 16, 18 may support different data transfer rates to both entities.

An explanation of how each of a put and get request from the CPU 12 is processed by the data transfer device of the current invention will now be described.

During a get or put request, the CPU 12 outputs a starting address via the ADDRESS/DATA bus 20 in the form of the CPU_DATA_IN signal. The starting address indicates the location in the memory 50 where it wants to read data from or write data to. The starting address is stored in the address register 300, 302, which are loaded in one or two cycles depending on whether the CPU 12 must write to the high address register 300, as described above. In the following clock cycle, after sending the address register 300, 302 of the stream controller 14, 16 or 18 the starting address, during a get request, the CPU 12 sends the stream controller 14, 16, or 18 the length in longwords which are to be read during a get request. This value is written to the length register 304.

However, during a put request, the CPU 12 begins to send the data to be written to the memory 50, immediately after sending the stream controller the starting address.

The signal MODE_GET_NOT_PUT is asserted by the CPU 12 to indicate to the stream controller 14, 16, or 18 when a get request, as opposed to a put request, is being asserted.

During a get request, the stream controller 14, 16 or 18 receives the starting address in the memory 50 and the number of longwords to be read, e.g. eight longwords. In response to the CPU writing a value to the length register, the decoder 220 generates a WRITE_LENGTH signal which indicates to the request controller 184 that a request has been asserted by the CPU 12. When the WRITE_LENGTH signal is received by the stream's request controller 184, it asserts the BUS_REQUEST signal which is output to the bus controller 32.

In response to receiving the BUS_REQUEST signal, the bus request controller 32 sends back a BUS_ACK signal to the stream controller 14, 16 or 18 causing the BUS_REQUEST signal to negate. The bus request controller 32 outputs the signal REQ_1 or REQ_2 to the bus interface 40 in order to obtain access to the bus 46. When the bus interface 40 has obtained access to the bus 46, it outputs the signal TRANSACTION_STARTED which indicates to the bus request controller 32 that it may proceed with the requested bus transaction.

The bus request controller 32 in turn, supplies the stream controller 14, 16, or 18 with the BUS_WRITE_PULSE signal which indicates, at each bus cycle, to the stream controller 14, 16, or 18 that data are stable on the system bus 46 and available for writing into one of the RAM's 98, 100. The signal is used to generate the WRITE_A and WRITE_B signals, as described above, to control the writing if the data into one of the RAM's 98, 100.

During a get operation, the signal MODE_GET_NOT_PUT will be asserted by the CPU 12. This causes the MUX 96 to select the BUS_DATA_IN signal as the data output of the MUX 96, which is supplied to the data inputs of buffers RAM_A 98 and RAM_B 100.

The write enable input of RAM_A 98 or RAM_B 100 will be enabled depending on the value of the signal FBUS_USERAMA which is generated by the flip-flop 166 after the end of each bus transaction. If the signal FBUS_USERAMA and BUS_WRITE_PULSE are asserted, indicating a write by the bus 46 to RAM_A 98 in response to a get request, the write input to RAM_A 98 will be enabled. However, if the signal WRITE_PULSE is asserted but FBUS_USERAMA is not asserted, it indicates that the bus will write the data to RAM_B 100. Accordingly, the WRITE_B signal will be asserted enabling RAM_B 100 to accept the data from the bus.

The data requested by the CPU 12 is written to the selected buffer in the stream controller RAM_A 98 or RAM_B 100 over several clock cycles as indicated above. After each longword is written to the buffer 98 or 100, the bus request controller 32 increments the BUS_RAM_COUNT which is used as the input signal ADDR_A or ADDR_B during bus data transfers to the buffers 98, 100.

The ADDR_A and ADDR_B signals are output by the MUXes 211 and 204 respectively. The MUXes 211 and 204 select the BUS_RAM_COUNT as the address input signal to RAM_A 98 and RAM_B 100 whenever the get control state machine 198 does not assert the COUNTER_SELECT_B signals respectively, and data are being transferred from the bus 46 to the buffer RAM_A 98 or RAM_B 100.

Once the bus 46 has written the requested data to the buffer RAM_A 98 or RAM_B 100 the bus interface 40 outputs the signal TRANSACTION_DONE which indicates to the bus controller 32 that the requested bus transaction was completed. The bus controller 32 in turn, asserts the output signal BUS_DONE which indicates to the stream controller 14, 16, or 18 that the transaction has been completed.

The BUS_DONE signal is supplied to the clock input of the flip-flop 166 and causes the value of the signal FBUS_USERAMA to negate. This has the effect of selecting the buffer 98 or 100 not used in the current transaction to be selected for using the next bus transaction.

When the bus 46 has stored the requested data in the buffer RAM_A 98 or RAM_B 100 and the stream controller 14, 16 or 18 receives the BUS_DONE signal, the ready bit is asserted in the status register indicating to the CPU 12 that it can read the requested data from the buffer RAM_A 98 or RAM_B 100 which contains the stored data.

To read data stored in one of the RAM's 98, 100 from the system bus 46 the CPU_READ/WRITE signal is asserted by the CPU 12 indicating to the decoder 220 that it is prepared to read the requested data which was stored in the buffer RAMA 98 or RAM_B 100.

The decoder 220 in turn asserts the CPU_READ_DATA signal which indicates to the get control state machine 198 that the stream controller 14, 16 or 18 should start unpacking the data stored in the buffer RAM_A 98 or RAM_B 100 and supply the unpacked data to the CPU 12.

The logic blocks 162 and 164 compare the BUS_RAM_COUNT signal, which indicates the number of longwords written to the buffer RAM_A 98 or RAM_B 100 by the bus 46 during the first part of the get request transaction, and the COUNT_A or COUNT_B signals which indicate the number of longwords read by the CPU 12. If the value of the BUS_RAM_COUNT signal does not equal the value of the COUNT signal for the buffer RAM_A 98 or RAM_B 100 it indicates that there are data available in the buffer RAM_A or RAM_B. Accordingly, the corresponding one of the DATA_AVAL_A and DATA_AVAL_B signals will be asserted.

The get control state machine 198, which has the signals DATA_AVAL_A and DAT_AVAL_B as inputs, generates the signals GET_INCREMENT_A and GET_INCREMENT_B which are used by the counters 140 and 142 to generate the ADDR_A and ADDR_B signals during CPU reads from the buffers RAM_A and RAM_B.

The ADDR_A and ADDR_B signals are used to control when data are being read from or written to RAM_A 98 or RAM_B 100, respectively. When an address signal, ADDR_A or ADDR_B is supplied to the buffer RAM_A 98 or RAM_B 100 respectively, and the write input to the buffer 98 or 100 is not enabled, it indicates that a read is being initiated.

When the CPU 12 is reading data from the buffers 98, 100 the get control state machine 198 will determine which buffer RAM_A 98 or RAM_B 100 is to be read from. The appropriate signal GET_INCREMENT_A or GET_INCREMENT_B will be asserted by the state machine 198 whenever a longword is read from the buffer 98 or 100.

In this manner, the INCREMENT signal of the appropriate counter 140, 142 will be asserted causing the counter to increment the value of the COUNT signal used as the register address signal during reads. The output of the counter 140 or 142 is selected by the MUX 211 or 204, respectively, to be the address signal input to RAM_A 98 or RAM_B 100 respectively. This selection occurs when the state machine 198 asserts the appropriate signal COUNTER_SELECT_A or COUNTER_SELECT_B which indicates which buffer RAM_A 98 or RAM_B 100 the CPU 12 is reading from.

Accordingly, it is one of the counters 140 or 142 that provide the address information to the buffer RAM_A or RAM_B during reads by the CPU 12.

In addition to controlling the incrementing of the counters used to generate the register address during a CPU read cycle, the get control state machine generates the LONG-WORD_UNPACKER_CONTROL signal. The MODE_STREAM_WIDTH signal indicates to the state machine 198 whether the CPU 12 is trying to read bytes or words. The state machine generates the LONGWORD_UN-PACKER_CONTROL signal to see that the longwords stored in the buffer RAMA 98 or RAMB 100 are unpacked to the appropriate format over a number of clock cycles.

As the CPU 12 reads the data stored in the buffer RAM_A 98 or RAM_B 100, the appropriate counter 140 or 142 is incremented as each longword is read. When the COUNT signal output by the counter 140 or 142 equals the BUS_RAM_COUNT the logic block 162 or 160 will deassert the respective DATA_AVAL_A or DATA_AVAL_B signals. Thus indicating that all the data in the buffer RAM_A or RAM_B has been read.

When there are more than eight longwords to be retrieved during a get request, several read cycles, with the data being read from RAM_A 98 and RAM_B 100 on an alternating basis, are required to retrieve all the data requested.

The CPU 12 initiates a put request in order to store data in the memory 50, by sending the stream controller 14, 16 or 18 a starting address in the memory 50 where the data are to be written and by not asserting the signal MODE_GET_NOT_PUT indicating that a put is being requested as opposed to a get request. After providing the starting address in the memory 50 to the stream controller via the CPU_DATA_IN signal, the CPU 12 uses the CPU_DATA_IN signal to transfer the data to be stored in the memory 50 to the stream controller 14, 16 or 18 over a series of cycles. During this process, the CPU 12 does not assert the CPU_READ/WRITE signal indicating to the stream controller 14, 16 or 18 that a write as opposed to a read is in progress.

During a put request, the byte/word to longword packer 71 receives the signal CPU_DATA_IN which contains data signals in the form of either bytes or words. The signal MODE_STREAM_WIDTH from the CPU 12 indicates to the put control state machine 200 whether the data entering the packer 71 is in bytes or words. The put control state machine 200 proceeds to generate the LONGWORD_PACKER_CONTROL signal which is used to control the packing off the data into longwords over a number of cycles as described above. The longword output of the packer 71 is coupled to the input of a MUX 96 which selects between the output of the packer 71 and the BUS_DATA_IN signal.

The MUX 96, which has its output coupled to the data inputs to the buffers RAM_A 98 and RAM_B 100 selects the packer output signal as to be supplied to the buffers 98, 100 when the control input signal MODE_GET_NOT_PUT is not asserted indicating that the CPU 12 is requesting that a put be serviced. In this manner, RAM_A 98 or RAM_B 100 is supplied with the packed data to be stored in the memory 50.

The put control state machine 200 determines which buffer RAM_A 98 or RAM_B 100 will be used to store the packed data from the CPU 12 depending on the availability of the buffers 98,100. The state machine 200 asserts the signal PUT_USINGA to indicate when RAMA_A 98 is being used. When the signal PUT_USINGA is not asserted, it indicates that the packed data from the CPU 12 is to be stored in RAM_B 100.

In addition to generating the PUT_USINGA signal, the state machine 200 generates the signal PUT_WRITE which is used to enable the write input of one of the buffer RAM_A 98 or RAM_B 100 in order to store the data from the CPU 12. When the PUT_USINGA and PUT_WRITE signals are asserted, the signal WRITE_A ia asserted by the OR gate 110 enabling the write input of RAM_A 98. However, if PUT_WRITE is asserted and PUT USINGA is not asserted, the signal WRITE_B output by the OR gate 116 will be asserted enabling RAM_B 100 to store the longwords output by the packer 71.

The addresses for the writing of data to RAM_A 98 and RAM_B 100 are output by the MUXes 211 and 206 which provide the signals ADDR_A and ADDR_B respectively. The ADDR_A and ADDR_B are generated by the MUXes 211 and 204 by selecting between the output of the counters 140, 142 and the BUS_RAM_COUNT signal depending on the whether the select control signals COUNTER_SELECT_A or COUNTER_SELECT_B are asserted respectively.

The select signals are asserted in response to the outputs of the put control state machine 200. When the signal PUT_WRITE is asserted indicating a write to one of the buffers 98, 100 as part of a put request, the output of the appropriate counter 140 or 142 will be selected as the address signal supplied to the buffer 98, 100 which is being used to store the data. When the select signal (PUT_WRITE * PUT_USINGA) is true, the MUX 211 will select COUNT_A output by the counter 140 as the signal ADDR_A for the address signal input to RAM_A 98. However, if PUT_WRITE is asserted indicating that a longword is being written to one of the buffers 98 or 100 as part of a put request, and PUT_USINGA is not asserted, then (PUT_WRITE * !PUT_USINGA) will be true and the output of counter 142 will be selected as the source of the address signals provided to RAM_B 100.

With the corresponding write of each longword output by the packer 71, the put control state machine will generate a PUT_INCREMENT_A or PUT_INCREMENT_B signal to increment the counter 140 or 142 depending on which buffer RAM_A 98 or RAM_B 100 is being used to store the data. Upon receiving the INCREMENT_A or INCREMENT_B signals the respective counter 140 or 142 will increment the COUNT signal providing an updated ADDR_A or ADDR_B signal to the respective counter RAM_A 98 or RAM_B 100.

If there are less than eight longwords to be stored in memory 50 during a given put request, the CPU 12 will assert the signal GO after all the data to be stored has been supplied to the stream controller 12, 14 or 16. Upon receiving the GO signal the request controller 184 will immediately assert a bus request.

If there are eight or more longwords to be stored in the memory 50 during a particular put request, a FULL_A or FULL_B signal will be asserted once a buffer RAM_A or RAM_B, respectively, has been filled with data, e.g. eight longwords. The FULL_A or FULL_B signal has the effect of causing the request controller 184 to assert a bus request so that the data can be transferred from the buffer 98 or 100 to the memory 50. In response to a FULL_A or FULL_B signal, the put control state machine will toggle the signal PUT_USINGA so that the second buffer can be used for storing the remaining data from the CPU 12.

However, when both buffers are full of data the RAM_FULL signal output by the OR gate 150 will be asserted and the signal PUT_STALL_WRITE generated by the put control state machine 200 will be asserted. The PUT_STALL_WRITE signal received from the put control state machine 200 via line 206 is decoded by the decoder 220 to de-assert the CPU_READY signal coupled to the CPU 12. Inasmuch as the assertion of the PUT_STALL_WRITE signal indicates a RAM full condition, the response of the decoder 220 to the PUT_STALL_WRITE to de-assert the CPU_READY signal prevents the CPU 12 from writing to the stream controller 14, 16, or 18 during a put operation until a buffer RAM_A 98 or RAM_B 100 is available and the PUT_STALL_WRITE signal is de-asserted.

When the bus request controller 32 receives a BUS_REQUEST signal it sends a request to the bus interface 40 and generates a BUS_ACK signal which is supplied to the stream controller 14, 16, or 18 causing it to deassert the BUS_REQUEST signal. Once the bus request controller 32 gains access to the bus 46, it sends a TRANSACTION_STARTED signal to the stream controller 14, 16 or 18 to indicate that the stream controller 14, 16, or 18 may proceed with the requested bus trans action.

If the data are to be read from RAM_A 98 and transferred to the memory 50 via the bus 46, the signal FBUS_USERAMA will be asserted. However, if FBUS_USERAMA is not asserted it indicates that the data will be read from RAM_B 100. Depending on which buffer 98 or 100 contains the data, the signal FBUS_USERAMA will enable the register 174 or 176 that supplies the appropriate logic block 162 or 160 with the signal BUS_RAM_COUNT. For example, if RAM_A contains the data to be store in the memory 50, register 174 will be enabled and the logic block 162 will be supplied with the input signals BUS_RAM_COUNT and COUNT_A.

The logic blocks 160 and 162 are used to determine when there are data remaining in the buffer RAMA_98 or RAM_B 100 which needs to be read. When a particular logic block is being read so the data can be stored in the memory 50, the appropriate logic block 162 or 160 compares the value of the BUS_PUT_COUNT to the value of COUNT_A or COUNT_B depending on which logic block is being read. If the BUS_PUT_COUNT does not equal the value of the COUNT signal it indicates that there is still data in the buffer 98 or 100 which must be stored in the memory 50.

The bus request controller 32 increments the BUS_RAM_COUNT for each longword that is stored in the memory 50 via the bus 46. When the BUS_PUT_COUNT equals the value of the COUNT signal, all the data has been read from the register and the bus controller 32 generates the signal BUS_DONE. The BUS_DONE serves to indicate during a put transaction that all the data in either RAM_A 98 or RAM_B 100 has been stored in the memory 50 as requested by the CPU 12.

The BUS_DONE signal also enables the clock input to the flip-flop 166 triggering the signal FBUS_USERAMA to toggle so that the next bus transaction will service the buffer 98 or 100 not used in the current bus transaction.

Figure 9A:
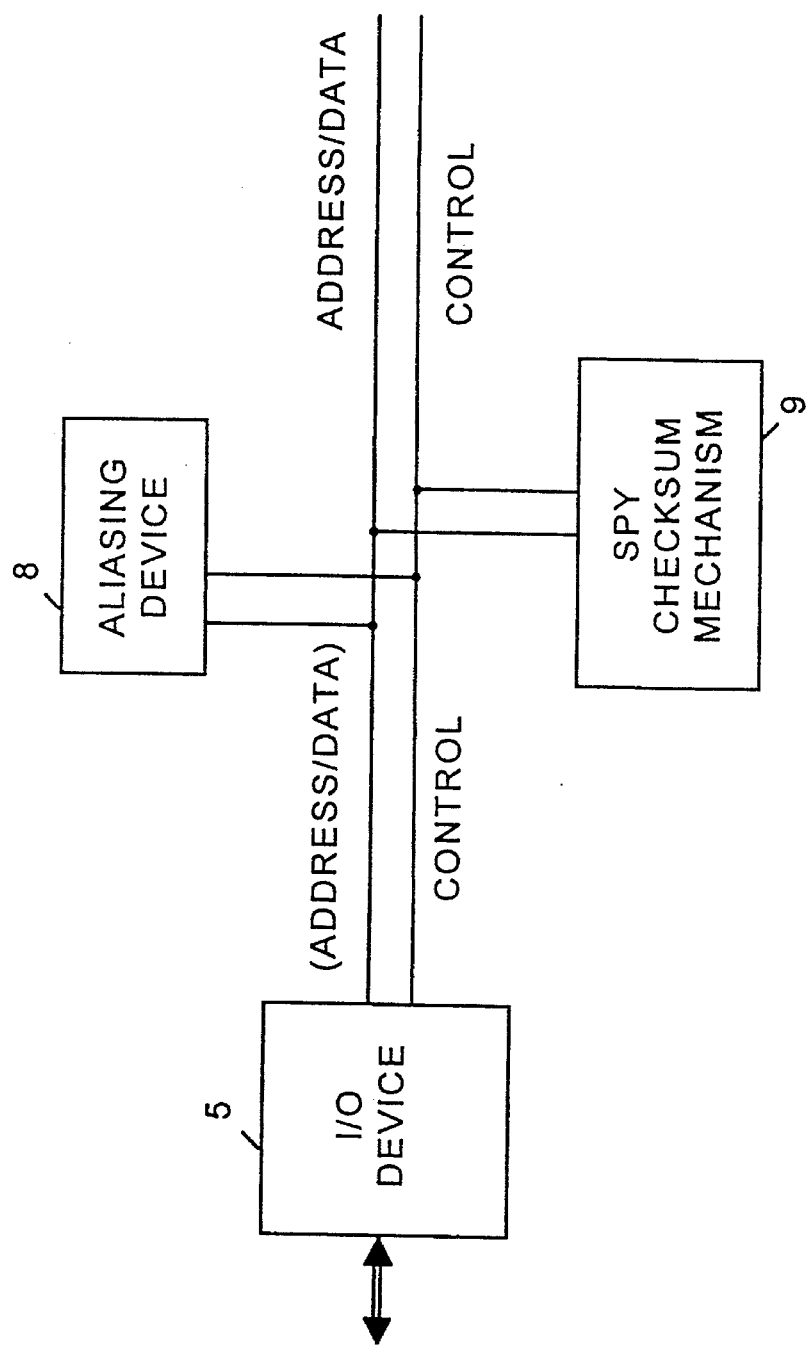
FIG. 9, which comprises the combination of FIGS. 9A and 9B, is a block diagram illustrating a further embodiment of the present invention illustrated in FIG. 1.
Figure 9B:
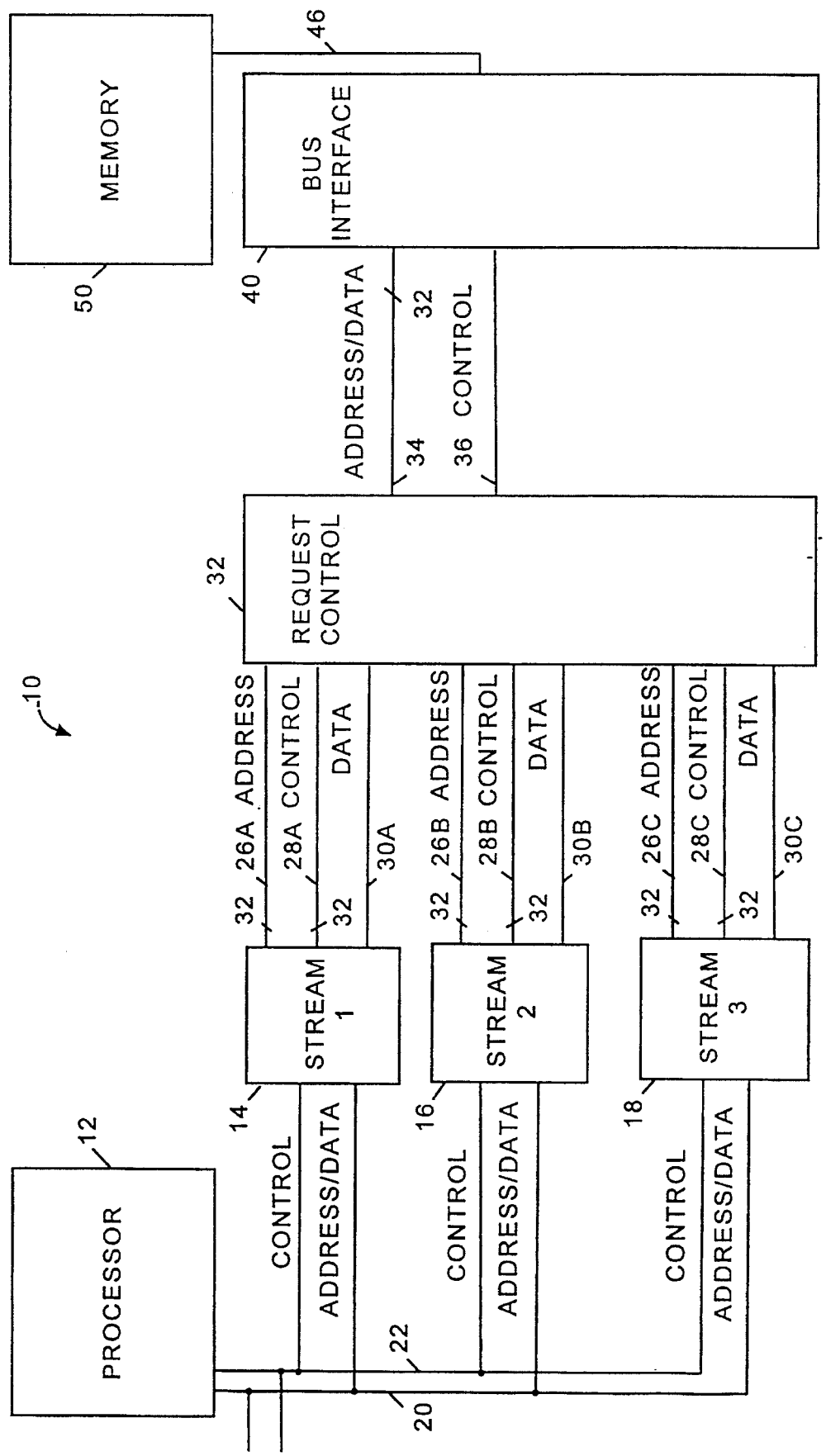

Referring now to FIG. 9, there is illustrated a further embodiment of the apparatus of the present invention illustrated in FIG. 1. Like numbered references in FIGS. 1 and 9 are as described above in regard to FIG. 1.

In FIG. 9, the address/data bus 20 and the control bus 22 are coupled to an aliasing device 8, a spy checksum mechanism 9, and an input/output (I/O) device 5 in addition to the CPU 12 and each of the stream controllers 14, 16, 18. The I/O device 5 has an I/O port which is available for coupling to various devices (not illustrated).

To further facilitate rapid performance of bus transactions and to reduce the overhead of the CPU 12, each of the stream controllers 14, 16, 18 can configured to operate with the CPU 12, the aliasing device 8 and the I/O device 5 in a COPY mode and a MIRROR mode as will be described below.

During certain parts of the data transfer between the I/O device 5 and the stream controllers 14, 16, 18, the CPU 12 may determine that it is accessing data that must be transferred to other devices. Rather than reading the data into the internal memory of the CPU 12, and then writing it out to one of the data stream devices 14, 16, or 18, (which requires at least two clock cycles), the CPU 12 can use the COPY mode which provides for the transfer of data to two addresses at the same time.

A PUT COPY mode is used by the CPU 12 to read a piece of data from the I/O device 5 into the CPU's internal memory and to transfer the data to one of the stream controllers 14, 16, or 18. During the PUT COPY mode the CPU 12 sends an address to the aliasing device 8 which is interpreted by the aliasing device 8 as an address to both the I/O device 5 and to one of the stream controller's 14, 16, or 18. The stream controller 14, 16 or 18 interprets a processor read from this address as a write. Thus, in a single processor clock cycle, the CPU 12 can read a piece of data from the I/O device 5 and write it into one of the stream controllers 14, 16, or 18.

Similarly, a GET COPY mode may also be used by the CPU 12. The GET COPY mode is used by the CPU 12 to read a piece of data that has been retrieved from the memory 50 and stored in one of the stream controller's data buffers RAM_A 98 or RAM_B 100, and to transmit the data to the I/O device 5 in a single transaction. The GET COPY mode works by mapping an alias of the I/O device's address and an alias of the stream controller's address into the same address. The I/O device interprets a processor read from this address as a write. Thus, in a single processor clock cycle, the CPU 12 can read a data byte from the stream controller 14, 16, or 18 and write it to the I/O device 5.

During certain parts of the transfer of data between the I/O device 5 and the stream controllers 14, 15, 16, the CPU 12 may determine that it is accessing data which must be written to two different stream controllers 14, 16, 18 in order for the data to be transmitted to two different devices. Rather than writing the data out to two stream controllers 14, 16, 18 in turn, (which requires at least two clock cycles), the CPU 12 can use MIRROR mode which will be described below. The MIRROR mode is only appropriate when data is being transmitted to two different devices so it is only bound with PUT streams.

One MIRROR mode, a MIRROR COPY mode works by mapping an alias of an address to the I/O device 5 and an alias of the addresses for two different PUT stream controllers 14, 16, 18 into the same address. The stream controllers 14, 16, 18 interpret a read from this address as a write. Thus, in a single bus cycle, the CPU 12 can read a byte of data from the I/O device 5 and write it into two different stream controllers 14, 16, 18 to be transmitted later to two different devices.

Another MIRROR mode, a MIRROR PUT mode, is used by the CPU 12 to transfer data from the CPU's internal memory to two different stream controllers 14, 16, 18 in a single transaction. The MIRROR PUT mode works by mapping an alias of the address for each one of two stream controllers 14, 16, 18 into the same address. Thus, in a single processor clock cycle, the CPU 12 can write a data byte from its internal memory into two different stream controllers 14, 16, 18.

The aliasing device 8 is shown in FIG. 9 as a single entity responsible for aliasing the addresses for both the I/O device 5 and the stream controllers 14, 16, 18. However, it is possible and may be preferable for the implementation of this function to be distributed between the I/O device 5 and the stream controllers 14, 16, 18.

The spy checksum mechanism 9 performs error detection by examining the data checksums at the interface between the I/O device 5, the stream controllers 14, 16, 18, and the CPU 12. This consolidates the checksum processing by eliminating the need for checksum implementation within any individual device.

The spy checksum mechanism 9 includes a DTE Checksum Spy which accumulates the checksum of the data as it enters the stream controllers 14, 16, 18; a FCS Checker Spy which performs a checksum on any data that enters the CPU 12 from any one of the stream controllers 14, 16, 18; and a FCS Generator Spy which performs a checksum on the data as it enters the I/O device enroute to another device.

The spy checksum mechanism 9 contains a set of registers (not illustrated) which are accessible to the CPU 12 for control purposes and to allow the accumulated values to be read.

When a data packet is received by the I/O device 5 from an external source, e.g. a transmission line, each byte is parsed by the CPU 12 as it is read out of the I/O device 5. The CPU 12 may transfer the byte directly from the I/O device 5 to one of the PUT stream controllers 14, 16, 18 (either by a read-then-write sequence or by a PUT COPY mode sequence) or it may transfer the byte directly from the I/O device 5 to two different PUT stream controllers 14, 16, 18 (either by a read-then-MIRROR PUT sequence or by a MIRROR COPY sequence). The CPU 12 may remove bytes or introduce additional bytes into the sequence as it transfers them to the PUT stream controllers 14, 16, 18. In all cases, the data stream written to a particular PUT stream controller 14, 16, 18 is examined by the DTE checksum spy.

Certain types of data packets stored in shared memory 50 and destined for transmission by the I/O device 5 are stored with a FCS which was verified when the data packet was originally received. A data packet of this type is transferred from memory 50 to the I/O device 5 via a particular GET stream 14, 16, 18 under the control of the CPU 12. As each byte of the data packet is read from the GET stream 14, 16, 18 (either by a read operation or a GET operation) the value of that byte is accumulated by the FCS Checker spy. When the whole data packet has been read by the CPU 12, a consequence of accumulating the stored value of the FCS associated with the data packet results in the total accumulated within the FCS Checker spy being equal to a fixed, known value verifying that the data packet has not been corrupted while it has been stored in the system. The CPU 12 may remove bytes or introduce additional bytes into the sequence as it transfers them to the I/O device 5. As each byte is transferred to the I/O device 5 (whether by read-then-write or GET COPY) the value of that byte is accumulated by the FCS Generator spy. When the stored value of the FCS associated with the data packet has been read from the GET stream 14, 16, 18, it is not transferred to the I/O device 5. Instead, the total accumulated within the FCS Generator spy is transferred to the I/O device 5. Thereby, the data packet is transmitted with an FCS which reflects the modifications which the CPU 12 has made to the data packet.

Thus, the spy checker mechanism 9 consolidates the checksum processing by eliminating the need for checksum implementation within any individual devices.

What is claimed is:

1. A data transfer device for coupling a processor to a system bus, said data transfer device comprising:

a processor bus system adapted for coupling to the processor for transfer of bus address information from the processor and for transfer of data to and from the processor;

a plurality of addressable registers, each one of the addressable registers being coupled to the processor bus system, the plurality of addressable registers including:

i) an address register for storing the bus address information and having a bus address output adapted for coupling to the system bus, and ii) a data register for storing data and having a data output;

a register address bus adapted for coupling to the processor for input of register address information;

a decoder coupled to the register address bus and to each of the addressable registers for enabling one of the registers at a time for input of bus address information or data from the processor bus system as a function of the register address information placed on the register address bus by the processor, in a sequence of processor operating cycles;

a bus data input adapted for coupling to the system bus for input of data from the system bus;

an internal buffer memory system selectively coupled to each of the bus data input and the data output of the data register for input of write data to the internal buffer memory system;

the internal buffer memory system having a bus data output adapted for coupling to the system bus and a processor data output coupled to the processor bus system;

a control state machine system coupled to each of the internal buffer memory system and the decoder and including an internal memory address generator for generating memory addresses for controllably writing data to the internal buffer memory system via the selective coupling to the data output of the data register and the bus data input;

the internal buffer memory system comprising a pair of RAM's and wherein the control state machine system controllably selects one of the pair of RAM's at a time for writing or reading of data.

2. The data transfer device of claim 1 further comprising a data packer coupling the data output of the data register to the internal buffer memory system to pack data from blocks of a first size received from the processor via the processor bus system to blocks of a second size for writing into the internal buffer memory system.

3. The data transfer device of claim 2, further comprising a data unpacker coupling the processor data output of the internal buffer memory system to the processor bus system to unpack data from blocks of the second size to blocks of the first size.

4. The data transfer device of claim 1, wherein the address register comprises at least a pair of address registers with preselected bits of each of the at least a pair of address registers being logically combined to provide corresponding bits of a system bus address.

5. A computer system which comprises:

a processor;

a system bus;

a processor bus system coupled to the processor for transfer of bus address information from the processor and for transfer of data to and from the processor;

a plurality of addressable registers, each one of the addressable registers being coupled to the processor bus system, the plurality of addressable registers including:
  i) an address register for storing the bus address information and having a bus address output adapted for coupling to the system bus, and
  ii) a data register for storing data and having a data output;

a register address bus coupled to the processor for input of register address information;

a decoder coupled to the register address bus and to each of the addressable registers for enabling one of the registers at a time for input of bus address information or data from the processor bus system as a function of the register address information placed on the register address bus by the processor, in a sequence of processor operating cycles;

a bus data input coupled to the system bus for input of data from the system bus;

an internal buffer memory system selectively coupled to each of the bus data input and the data output of the data register for input of write data to the internal buffer memory system;

the internal buffer memory system having a bus data output coupled to the system bus and a processor data output coupled to the processor bus system;

a control state machine system coupled to each of the internal buffer memory system and the decoder and including an internal memory address generator for generating memory addresses for controllably writing data to the internal buffer memory system via the selective coupling to the data output of the data register and the bus data input;

the internal buffer memory system comprising a pair of RAM's and wherein the control state machine system controllably selects one of the pair of RAM's at a time for writing or reading of data.

6. A data transfer device for coupling a processor to a system bus having data and control lines, said data transfer device comprising:

a processor bus system adapted for coupling to the processor for transfer of bus address information and bus data write control information from the processor and for transfer of data to and from the processor;

an internal buffer memory system controllably directly coupled to the processor bus system, and adapted for controlled direct coupling to the data lines of the system bus;

a control state machine system coupled to each of the internal buffer memory system and the processor bus system and adapted for coupling to the control lines of the system bus;

the control state machine including an internal memory address generator for generating memory addresses for controllably writing data to the internal buffer memory system via one of the direct coupling from the processor and the direct coupling from the data lines of the system bus to the internal buffer memory;

the control state machine system being independently responsive to each of the bus data write control information from the processor and the control information on the control lines of the system bus, one at a time, to generate memory addresses for controllably writing data to the internal buffer memory system from one of the processor and the data lines of the system bus at a speed determined by one of the bus data write control information from the processor and the control information on the control lines of the system bus, respectively.

7. The data transfer device of claim 6, wherein the internal buffer memory system further comprises:

a bus data input coupled to the processor bus system and adapted for coupling to the data lines of the system bus for input of data from one of the processor and the system bus, and a bus data output adapted for coupling to the data lines of the system bus, and a processor data output coupled to the processor bus system.

8. The data transfer device of claim 7, further comprising:

a line select device which has a first input adapted for coupling to the system bus for input of data from the system bus and a second input coupled to the processor bus system for input of data from the processor;

the output of the line select device being directly coupled to the data input of the internal buffer memory system, and the line select device being responsive to a control select signal from the control state machine system to selectively couple one of the processor bus system and the data lines of the system bus to the data input of the internal buffer memory creating the direct data path between one of the processor and the system bus, and the internal buffer memory.

9. The data transfer device of claim 8, further comprising:

a data packer coupling the processor bus system to the first input of the line select device to pack data from blocks of a first size received from the processor via the processor bus system to blocks of a second size for writing into the internal buffer memory system.

10. The data transfer device of claim 9, further comprising:

a data unpacker coupling the processor data output of the internal buffer memory system to the processor bus system to unpack data from blocks of the second size to blocks of the first size.

11. The data transfer device of claim 6 wherein said internal buffer memory system has more than one storage location.

12. A computer system, comprising:

a processor;

a system bus having data and control lines;

a processor bus system for coupling to the processor for transfer of bus address information and bus data write control information from the processor and for transfer of data to and from the processor;

an internal buffer memory system controllably directly coupled to the processor bus system, and controllably directly coupled to the data lines of the system bus;

a control state machine system coupled to each of the internal buffer memory system, the processor bus system and to the control lines of the system bus;

the control state machine including an internal memory address generator for generating memory addresses for controllably writing data to the internal buffer memory system via one of the direct coupling from the processor and the direct coupling from the data lines of the system bus to the internal buffer memory;

the control state machine system being independently responsive to each of the bus data write control information from the processor and the control information on the control lines of the system bus, one at a time, to generate memory addresses for controllably writing data to the internal buffer memory system from one of the processor and the data lines of the system bus at a speed determined by one of the bus data write control information from the processor and the control information on the control lines of the system bus, respectively.

* * * * *